(12) United States Patent
Gao et al.

(10) Patent No.: US 12,411,344 B2
(45) Date of Patent: Sep. 9, 2025

(54) LIQUID CRYSTAL DEVICE FOR ELECTRICALLY TUNABLE VISION CORRECTION

(71) Applicant: Goertek Electronics Inc., Santa Clara, CA (US)

(72) Inventors: Kun Gao, Dublin, CA (US); Takeo Matsukawa, San Jose, CA (US)

(73) Assignee: Goertek Electronics Inc., Santa Clara, CA (US)

( * ) Notice: Subject to any disclaimer, the term of this patent is extended or adjusted under 35 U.S.C. 154(b) by 34 days.

(21) Appl. No.: 18/436,907

(22) Filed: Feb. 8, 2024

(65) Prior Publication Data

US 2025/0102801 A1 Mar. 27, 2025

Related U.S. Application Data

(60) Provisional application No. 63/584,725, filed on Sep. 22, 2023.

(51) Int. Cl.
*G02B 27/01* (2006.01)
*G02F 1/1333* (2006.01)
(Continued)

(52) U.S. Cl.
CPC ... *G02B 27/0172* (2013.01); *G02F 1/133368* (2021.01); *G02F 1/133526* (2013.01);
(Continued)

(58) Field of Classification Search
None
See application file for complete search history.

(56) References Cited

U.S. PATENT DOCUMENTS

| 2004/0156021 A1* | 8/2004 | Blum | G02C 7/101 |
| | | | 351/233 |
| 2008/0055541 A1* | 3/2008 | Coulter | G02C 7/101 |
| | | | 351/159.45 |

(Continued)

FOREIGN PATENT DOCUMENTS

CN 115066648 A 9/2022

OTHER PUBLICATIONS

International Search Report and Written Opinion received for PCT Patent Application No. PCT/US2024/061750, mailed on Feb. 26, 2025, 10 pages.

(Continued)

*Primary Examiner* — Nicholas J Lee
(74) *Attorney, Agent, or Firm* — ARENTFOX SCHIFF LLP

(57) ABSTRACT

Aspects of the disclosure provide a liquid crystal (LC) device, a head mounted display (HMD) system, and a method of tuning the HMD system. The LC device includes a first electrode structure disposed on a first substrate with an elliptical shape. The first electrode structure includes parallel first segments connected by second segments. The LC device includes a plurality of first control electrodes electrically coupled with the first electrode structure. The plurality of first control electrodes is configured to form LC lenses at different positions. Each of the LC lenses at the different positions is formed when electrical signals are applied to a subset of the plurality of first control electrodes that is associated with the respective LC lens. The LC device includes a second electrode structure disposed on a second substrate and at least one second control electrode electrically coupled with the second electrode structure.

19 Claims, 14 Drawing Sheets

(51) Int. Cl.
*G02F 1/1335* (2006.01)
*G02F 1/1343* (2006.01)
*G06F 3/01* (2006.01)
*G06T 19/00* (2011.01)

(52) U.S. Cl.
CPC ........ *G02F 1/134309* (2013.01); *G06F 3/013* (2013.01); *G06T 19/006* (2013.01)

(56) References Cited

U.S. PATENT DOCUMENTS

| | | | | |
|---|---|---|---|---|
| 2008/0084534 | A1* | 4/2008 | Lindacher | A61F 2/1602 351/159.08 |
| 2014/0192298 | A1 | 7/2014 | Sumiyoshi | |
| 2022/0066073 | A1 | 3/2022 | Yadin et al. | |
| 2022/0252904 | A1 | 8/2022 | Hones, Jr. et al. | |
| 2023/0375884 | A1* | 11/2023 | Yadin | G02F 1/29 |

OTHER PUBLICATIONS

Apple Vision Pro, https://www.apple.com/apple-vision-pro/, pp. 1-35.
Half Dome Updates: FRL Explores More Comfortable, Compact VR Prototypes for Work, Meta Quest Blog, Sep. 25, 2019, pp. 1-7.
H. Ren, D. W. Fox, B. Wu, and S. Wu, "Liquid crystal lens with large focal length tunability and low operating voltage," Opt. Express, vol. 15, pp. 11328-11335, 2007.
L. Li, D. Bryant, T. V. Heugten, D. Duston, and P. J. Bos, "Near-diffraction-limited tunable liquid crystal lens with simplified design," Optical Engineering, vol. 52, No. 3, p. 1-8, 2013.
Liwei Li, Lei Shi, Doug Bryant, Philip J. Bos, Tony van Heugten, Dwight Duston, "Design and modeling of a refractive liquid crystal lens for tunable optical correction in 3-D stereoscopic displays," SID Symposium Digest, vol. 42, No. 9, 2011, pp. 1-4.
R. Doron, A. I. Shalev, and Y. Yadin, "Adaptive liquid crystal lenses as a new option for presbyopia correction," presented at the 2023 ARVO Annual Meeting, New Orleans, LA, Apr. 23-27, 2023, pp. 1-2.
S. Sato, "Liquid-crystal lens cells with variable focal length," Jpn. J. Appl. Phys., vol. 18, No. 9, pp. 1679-1684, 1979.
S. Sato, A. Sugiyama, and R. Sato, "Variable-focus liquid-crystal Fresnel lens," Jpn. J. Appl. Phys., vol. 24, pp. L626-L628, 1985.
G. Li, D. Mathine, P. Valley, P. Ayras, J. Haddock, M. Giridhar, G. Williby, J. Schwiegerling, G. Meredith, B. Kippelen, S. Honkanen, and N. Peyghambarian, "Switchable electro-optic diffractive lens with high efficiency for ophthalmic applications," PNAS, vol. 103, p. 6100, 2006.
N. Bennis, T. Jankowski, O. Strzezysz, et al., "A high birefringence liquid crystal for lenses with large aperture," Sci Rep, vol. 12, p. 14603, 2022.
L. Bégel, B. Khodadad, and T. Galstian, "Adaptive lens for foveal vision, imaging, and projection over large clear apertures," Opt. Express 31, 2877-2891 2023.
K. Gao et al., "Liquid Crystal for Vision Correction," U.S. Appl. No. 18/125,560, filed Mar. 23, 2023.

* cited by examiner

Combination of the LC Lenses and a lens with a fixed optical power for varifocal operation

| Combined Optical Power (D) of LC Lenses formed in (241)-(242) | 4 | 3 | 2 | 1 | 0 | -1 | -2 | -3 | -4 |
|---|---|---|---|---|---|---|---|---|---|
| Optical Power (D) of Lens (243) | -2 | -2 | -2 | -2 | -2 | -2 | -2 | -2 | -2 |
| Total Optical Power (D) | 2 | 1 | 0 | -1 | -2 | -3 | -4 | -5 | -6 |

*FIG. 3*

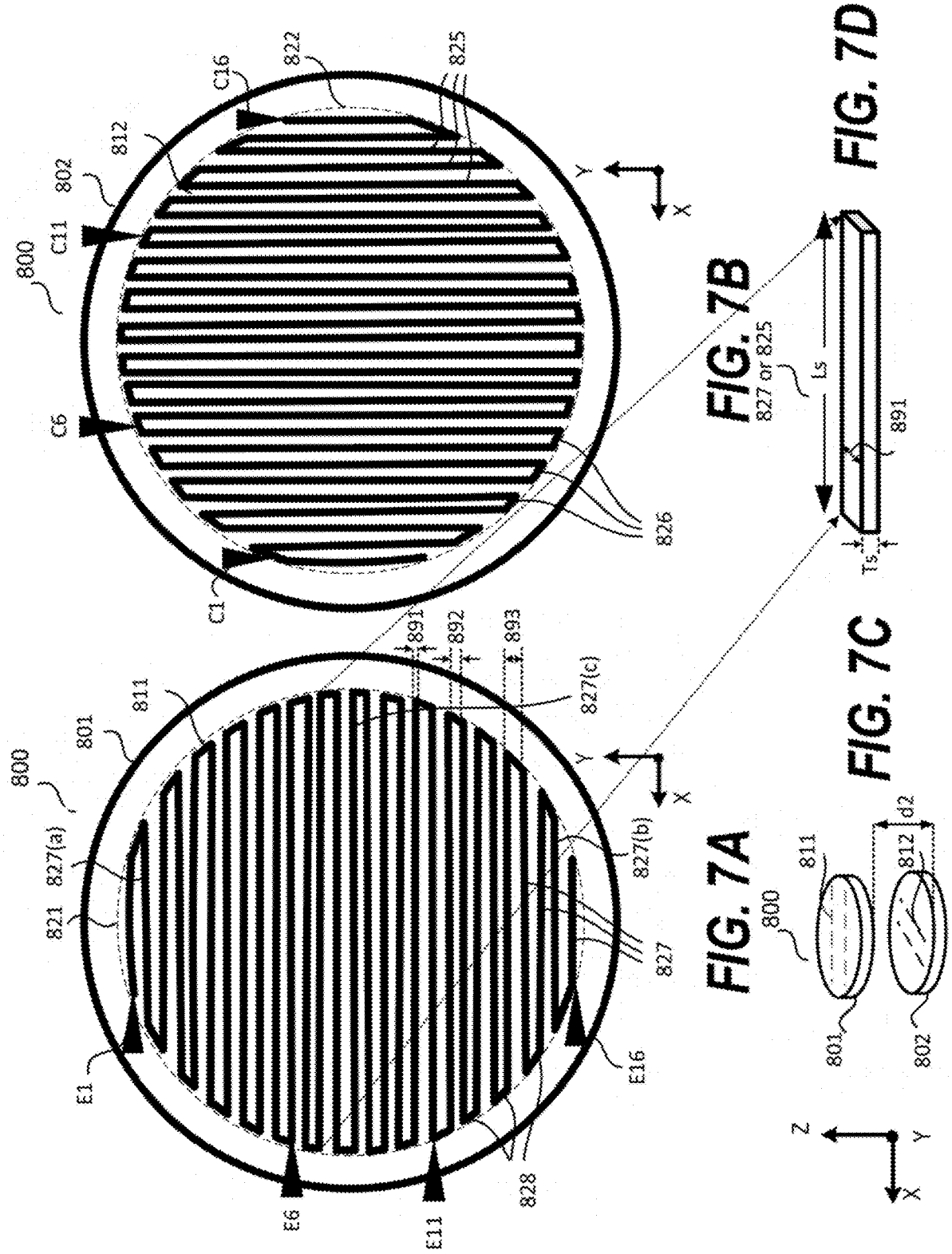

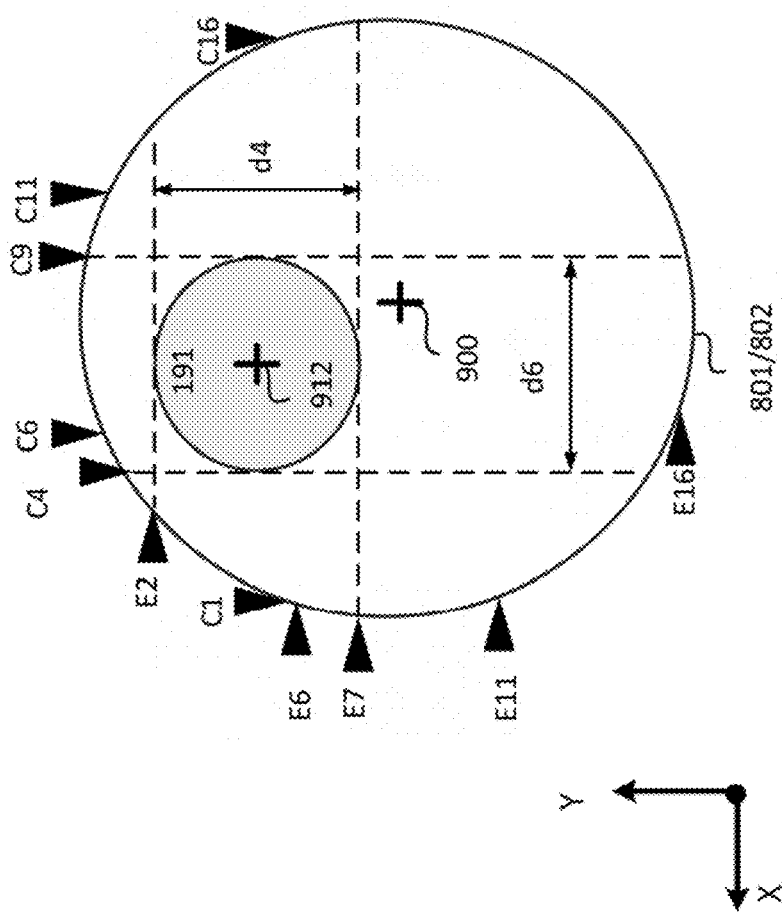
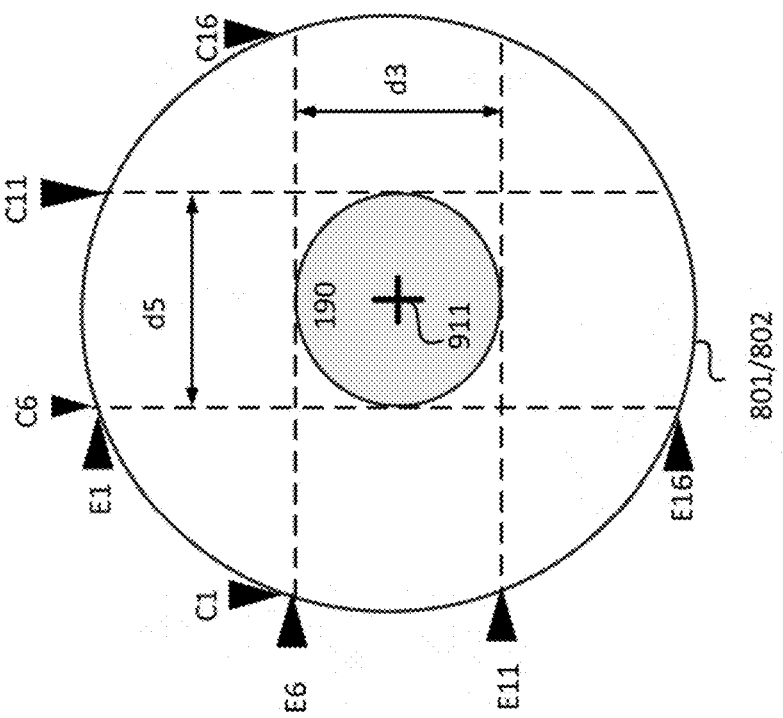
FIG. 8B
FIG. 8A

LIQUID CRYSTAL DEVICE FOR ELECTRICALLY TUNABLE VISION CORRECTION

INCORPORATION BY REFERENCE

The present disclosure claims the benefit of priority to U.S. Provisional Application No. 63/584,725, "METHOD AND APPARATUS FOR RAPID DYNAMIC VISION CORRECTION WITHIN MIXED REALITY SYSTEMS" filed on Sep. 22, 2023, which is incorporated by reference herein in its entirety.

TECHNICAL FIELD

The present disclosure includes aspects related to display technology, such as near eye display technology.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Near eye display (NED) devices are being developed to provide an improved user experience in fields such as augmented reality (AR) and virtual reality (VR). The NED devices can include various wearable devices, such as a head mounted display (HMD) device, smart glasses, and the like. In an example, an HMD device includes a relatively small display device and optics that can create a virtual image in the field of view of one or both eyes. To the eye, the virtual image appears at a distance and appears much larger than the relatively small display device.

SUMMARY

Aspects of the disclosure provide a liquid crystal (LC) device. The LC device includes a first electrode structure disposed on a first substrate with an elliptical shape. The first electrode structure is transparent and includes parallel first segments connected by second segments. The first segments can be longer than the second segments. The LC device includes a plurality of first control electrodes that are electrically coupled with the first electrode structure. The plurality of first control electrodes is configured to form LC lenses with different positions. Each of the LC lenses with the different positions is formed when electrical signals are applied to a subset of the plurality of first control electrodes that is associated with the respective LC lens. The LC device includes a second electrode structure disposed on a second substrate that is parallel to the first substrate and at least one second control electrode that is electrically coupled with the second electrode structure.

In an example, a region of the first substrate that includes the first electrode structure has the elliptic shape.

In an example, the first segments are linear.

In an example, the elliptical shape is a circular shape.

In an example, the second substrate has an elliptical shape. The second electrode structure is transparent and includes parallel first segments connected by second segments and the first segments are longer than the second segments. The at least one second control electrode includes a plurality of second control electrodes. Each of the LC lenses with the different positions is formed when the electrical signals are applied to the subset of the plurality of first control electrodes that is associated with the respective LC lens and electrical signals are applied to a subset of the plurality of second control electrodes that is associated with the respective LC lens.

In an example, the first segments in the first electrode structure are perpendicular to the first segments in the second electrode structure.

In an example, a width of the first segments is from 1 to 100 microns, a gap between adjacent segments of the first segments is from 1 to 10 microns, and an area of the LC lens is from 1 millimeter (mm) to 20 mm.

In an example, a difference between a first resistance between a first adjacent pair of the plurality of first control electrodes and a second resistance between a second adjacent pair of the plurality of first control electrodes is less than a threshold.

In an example, a resistivity p of the first electrode structure is from 0.001 to 0.1 ohm-meters.

Aspects of the disclosure provide a head mounted display (HMD) system. The HMD system includes a sensor configured to detect information indicating a gaze direction of an eye of a user of the HMD system, a processor configured to determine the gaze direction based on the information detected by the sensor, a liquid crystal (LC) device, and a controller. The LC device includes a first electrode structure disposed on a first substrate with an elliptical shape. The first electrode structure is transparent and includes parallel first segments connected by second segments. The first segments are longer than the second segments. The LC device includes a plurality of first control electrodes that are electrically coupled with the first electrode structure. The plurality of first control electrodes is configured to form LC lenses with different center positions to adjust an optical power of the HMD system. Each of the LC lenses with the different center positions is formed when electrical signals are applied to a subset of the plurality of first control electrodes that is associated with the respective LC lens. The LC device includes a second electrode structure disposed on a second substrate that is parallel to the first substrate, and at least one second control electrode that is electrically coupled with the second electrode structure. The controller is configured to determine a subset of first control electrodes in the plurality of first control electrodes based on the gaze direction.

In an example, the HMD system includes a virtual reality (VR) viewing optical system disposed between a display device and the LC device. The VR viewing optical system includes a plurality of lenses configured to direct light beams from the display device to the LC lens formed in the LC device. The optical power of the HMD system is based on an optical power of the LC lens and an optical power of the VR viewing optical system.

In an example, the HMD system includes an augmented reality (AR) viewing optical system disposed between a display device and the LC device. The AR viewing optical system includes a plurality of lenses configured to direct light beams from the display device and light beams from a real object to the LC lens formed in the LC device. The optical power of the HMD system is based on an optical power of the LC lens and an optical power of the AR viewing optical system.

Aspects of the disclosure provide a method of tuning a display system. The method includes determining, based on vision correction information of a user of the display system, an optical power of a liquid crystal (LC) lens to be formed in an LC device for vision correction. The LC device includes a first electrode structure and a plurality of first control electrodes that are electrically coupled with the first electrode structure. The first electrode structure is disposed on a first substrate with an elliptical shape, is transparent, and includes parallel first segments connected by second segments, and the first segments are longer than the second segments. The method includes determining a gaze direction of an eye of the user of the display system, determining a position of the LC lens in the LC device based on the gaze direction, determining (i) a subset of first control electrodes in the plurality of first control electrodes to which first voltage signals are applied and (ii) the first voltage signals to be applied to the subset of first control electrodes based on the position and the optical power of the LC lens, and applying the determined first voltage signals to the determined subset of first control electrodes to form the LC lens at the determined position corresponding to the gaze direction for the vision correction.

In an example, the LC device includes a second electrode structure and a plurality of second control electrodes that are electrically coupled with the second electrode structure. The second electrode structure is disposed on a second substrate that is parallel to the first substrate, has an elliptical shape, is transparent, and includes parallel first segments connected by second segments, and the first segments in the second electrode structure are longer than the second segments in the second electrode structure. The method further includes determining (i) a subset of second control electrodes in the plurality of second control electrodes to which second voltage signals are applied and (ii) the second voltage signals to be applied to the subset of second control electrodes based on the position and the optical power of the LC lens. The applying includes applying the determined first voltage signals to the determined subset of first control electrodes and applying the determined second voltage signals to the determined subset of second control electrodes to form the LC lens at the determined position corresponding to the gaze direction to correct for the at least one of the nearsightedness or the farsightedness.

BRIEF DESCRIPTION OF THE DRAWINGS

Further features, the nature, and various advantages of the disclosed subject matter will be more apparent from the following detailed description and the accompanying drawings in which:

FIG. 3 shows examples of a total optical power of multiple lenses according to an aspect of the disclosure.

FIGS. 7A-7C show examples of a top view of an LC device according to an aspect of the disclosure.

FIG. 7D shows an example of a perspective view of a first segment in the first electrode structure or the second electrode structure according to an aspect of the disclosure.

FIGS. 8A-8B show examples of LC lenses formed in different regions in an LC device according to an aspect of the disclosure.

DETAILED DESCRIPTION OF EMBODIMENTS

Eye characteristics, such as visual acuity (or sharpness of vision), can vary greatly among users of a display system. When the display system (e.g., a head mounted display (HMD) system) is used by various users or a user with changing or different eye conditions (e.g., myopia, hyperopia, and/or astigmatism), certain user(s) may not see images on the display clearly without vision correction. In some cases, the vision correction may be performed by the display system.

According to an aspect of the disclosure, the display system can include a vision correction optical system that is configured to perform the vision correction, for example, by adjusting an optical power of the LC optical system. In an aspect, the vision correction optical system can include a liquid crystal (LC) device and can be referred to as an LC vision correction optical system. The LC vision correction optical system can include an electrically tunable LC lens formed in the LC device. According to an aspect of the disclosure, the LC device may include a first electrode structure disposed on a first substrate. The first electrode structure can include first segments (e.g., parallel first segments) connected by second segments. In an aspect, the first substrate has an elliptical shape or a circular shape that is compatible with other optical components in the display system and thus allowing easy coupling or integration of the LC device into the display system.

The LC device may include first control electrode(s) such as a plurality of first control electrodes that can be electrically coupled with the first electrode structure. The plurality of first control electrodes can be configured to form LC lenses with different positions on the first substrate, for example, based on gaze directions of an eye of a user of the display system. Each of the LC lenses with the different positions can be formed when electrical signals are applied to a subset of the plurality of first control electrodes that is associated with the respective LC lens. The position of the respective LC lens can vary with positions of the subset of the plurality of first control electrodes on the first substrate.

Figure 1A:
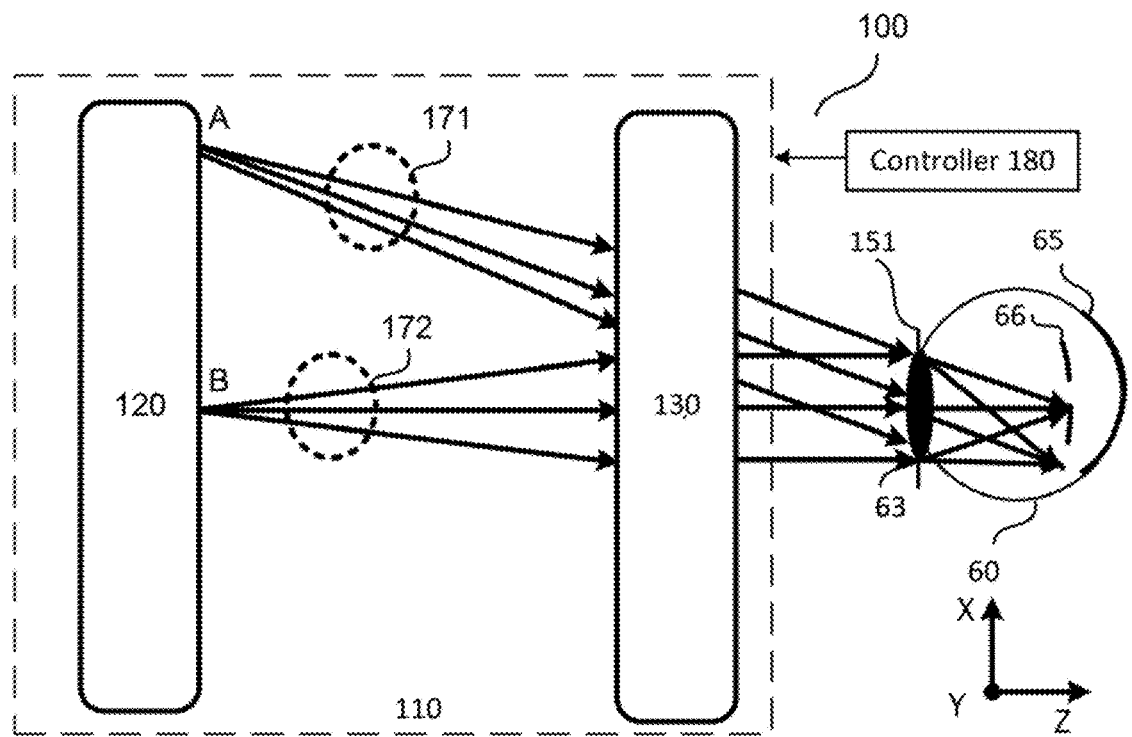
FIG. 1A shows a display system in a side view according to some aspects of the disclosure.

FIG. 1A shows a display system (e.g., a near eye display system) (100) in a side view according to some aspects of the disclosure. The display system (100) includes an optical system (110) and a controller (180). The controller (180) is coupled to the optical system (110) to control the operations of the optical system (110). The optical system (110) can include a display device (120) and a viewing optical system (e.g., a virtual reality (VR) viewing optical system) (130). The display device (120) can include a pixel array configured to emit light beams and display images. The viewing optical system (130) can direct the emitted light beams from the display device (120) to an area (151). In an example, the area (151) is located in an XY plane, and may be referred to as an exit pupil of the optical system (110). The XY plane includes an X axis and a Y axis that is orthogonal to the X axis. A light receiver or detector, such as an eye of a user or the like, can be located at the area (151). Referring to FIG. 1A, the optical system (110) can be configured to be positioned within a distance threshold (e.g., 35 mm) of an eye of a user (e.g., the eye (60)), and the display system (100) can be referred to as a near eye display (NED) system. For example, the display system (100) is a head mounted display (HMD) system worn by a user.

In various examples, the display system (100) can be used by different users with different eye characteristics or conditions, such as different eye prescription (or vision correction) information. In an example (not shown in FIG. 1A), a lens in a first eye forms a clear image on a retina of the first eye, and thus the first eye sees an image displayed on the display device (120) clearly. In an example shown in FIG. 1A, a lens (63) in a second eye (e.g., the eye (60)) forms an image not on a retina (65) of the eye (60), and thus the eye (60) does not see an image displayed on the display device (120) clearly. For example, in FIG. 1A, the lens (63) in the eye (60) forms an image on a surface (66) in front of the retina (65) of the eye (60) when the eye (60) is nearsighted.

Various components in an eye, such as a cornea, a lens, and the like, can manipulate light into the eye to form an image. For purposes of brevity, an image formation function of the various components is represented by a lens (e.g., the lens (63)) of the eye.

Figure 1B:
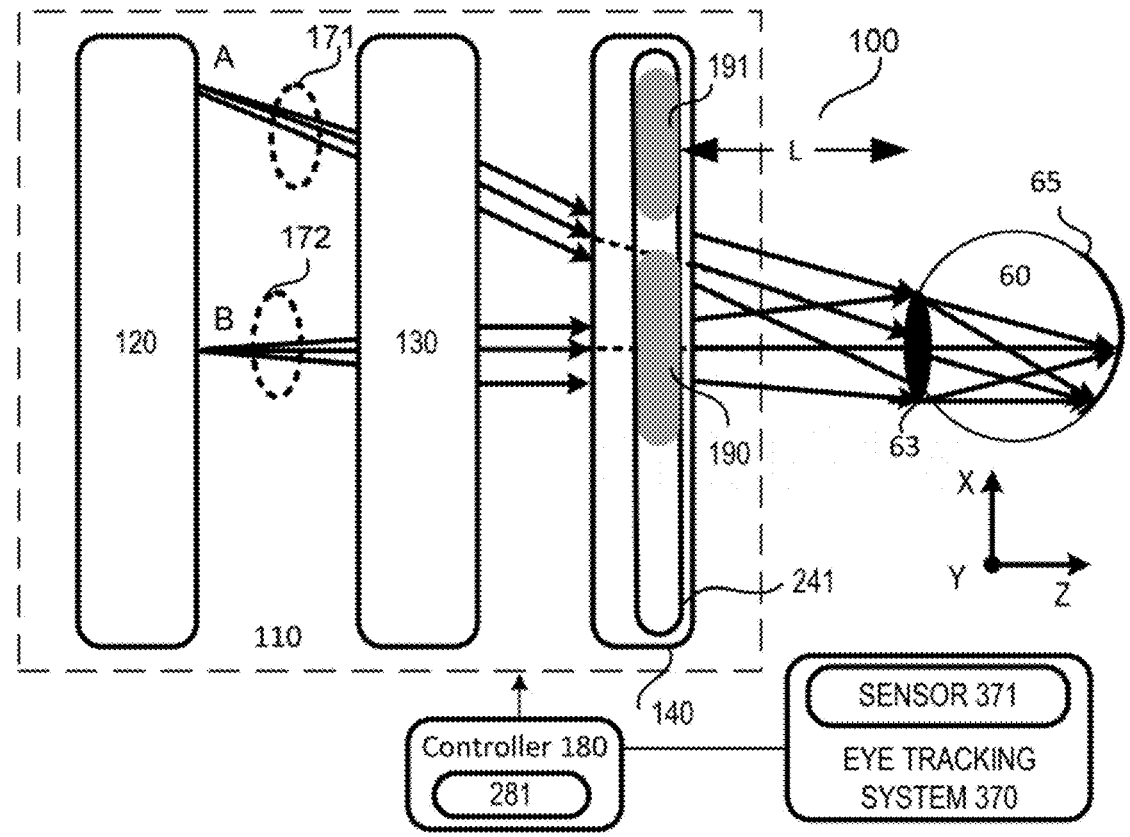
FIG. 1B shows a display system that includes a vision correction optical system in a side view according to some aspects of the disclosure.

According to an aspect of the disclosure, referring to FIG. 1B, in order to adapt the display system (100) to different eye characteristics or conditions and to form images on retina(s) of one or more eyes with the different eye characteristics or conditions, the optical system (110) can include a vision correction optical system (140). In an aspect, the vision correction optical system (140) is tunable (e.g., dynamically adjusted such as electrically tunable). In an example, the display system (100) includes an electrically tunable controller (281) that is configured to electrically control one or more components in the LC vision correction optical system (140). In an example, the controller (180) can include the electrically tunable controller (281). Further, the vision correction optical system (140) may have a small thickness that is suitable for a NED system. Referring to FIG. 1B, the vision correction optical system (140) can include LC material(s) or LC device(s), and thus can be referred to as the LC vision correction optical system (140).

In an aspect, in FIG. 1A, light rays (171) emitted from a pixel A on the display device (120) become collimated (e.g., parallel to each other) after passing through the VR viewing optical system (130). If the eye (60) is nearsighted, the collimated light rays (171) may be focused onto the surface (66) in front of the retina (65), and thus the eye (60) cannot see the pixel A clearly. Similarly, light rays (172) emitted from a pixel B on the display device (120) become collimated after passing through the VR viewing optical system (130). The collimated light rays (172) can be focused onto the surface (66) in front of the retina (65), and thus the eye (60) cannot see the pixel B clearly. Accordingly, the eye (60) cannot see clearly an image on the display device (120).

In FIG. 1B, the collimated light rays (171) from the VR viewing optical system (130) are incident onto the LC vision correction optical system (140). The LC vision correction optical system (140) can be electrically tuned as a diverging lens. Thus, the light rays (171) coming out of the LC vision correction optical system (140) diverges and can be focused onto the retina (65). Thus, the eye (60) that is nearsighted can see the pixel A clearly. Similarly, the light rays (172) coming out of the LC vision correction optical system (140) diverges and can be focused onto the retina (65). Accordingly, the eye (60) can see clearly an image on the display device (120).

Referring to FIG. 1B, the LC vision correction optical system (140) can include one or more LC devices including an LC device (241). The LC device (241) can be substantially identical to (e.g., identical or similar to) the LC device described above. The LC device (241) can include a first electrode structure disposed on a first substrate. The first substrate can have any suitable shape. In an aspect, the LC device (241) and the first substrate can have a circular shape, an elliptical shape, or the like that is compatible to other optical components (e.g., the viewing optical system (130)) in the display system (100), and thus may allow easy coupling to the other optical components in the display system (100). The LC device (241) may include a plurality of first control electrodes that can be electrically coupled with the first electrode structure at different positions of the first substrate. LC lenses with different positions in the LC device (241) can be formed by applying electrical signals (e.g., voltage signals) to different subsets of the plurality of first control electrodes, for example, in response to different gaze directions. Each subset of the plurality of first control electrodes can be associated with the respective LC lens. The positions of each subset of the plurality of first control electrodes can determine the corresponding position of the respective LC lens. The LC lenses formed in the LC device (241) can provide dynamic vision correction such as electrically tunable vision correction. For example, an optical power of an LC lens can be electrically tuned to correct for nearsightedness or farsightedness.

The gaze direction can be determined using any suitable method and by any suitable apparatus or system. The display system (100) can include an eye tracking system (370) that is configured to determine a gaze direction (e.g., an eye looks in the gaze direction) of an eye of the user of the display system (100). The eye tracking system (370) can determine the gaze direction of the eye (60) using (i) optical methods and optical components and/or (ii) non-optical methods and non-optical components. The eye tracking system (370) can include a sensor (371) such as a camera (e.g., an infrared camera) that can detect or obtain information such as eye movement, eye positions, and/or the like that can indicate the gaze direction. In an example, light, including infrared light, is reflected from the eye (60) and sensed by the sensor (371) such as a camera. The information can be analyzed to extract eye rotation from changes in reflections. Video-based eye trackers can use (i) the corneal reflection and the center of the pupil as features to track over time; (ii) reflections from the front of the cornea and the back of the lens as features to track; and/or the like and can determine the gaze direction. In an example, features from inside the eye such as the retinal blood vessels can be imaged and followed as the eye (60) rotates, and the gaze direction can be determined. The eye tracking system (370) and/or the controller (180) can determine the gaze direction. The controller (180) can be configured to determine which subset of first control electrodes in the plurality of first control electrodes is to be used to form the respective LC lens, for example, based on the gaze direction. Accordingly, the positions of the LC lenses formed in the LC device (241) can vary with the gaze directions. The positions of the LC lenses can be determined based on the gaze directions.

Figure 1C:
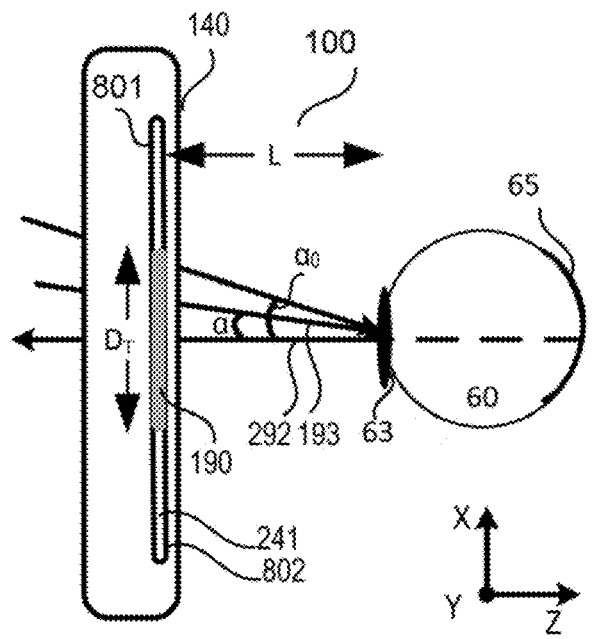
FIGS. 1C-1F show a portion of the display system that includes the vision correction optical system according to an aspect of the disclosure.
Figure 1D:
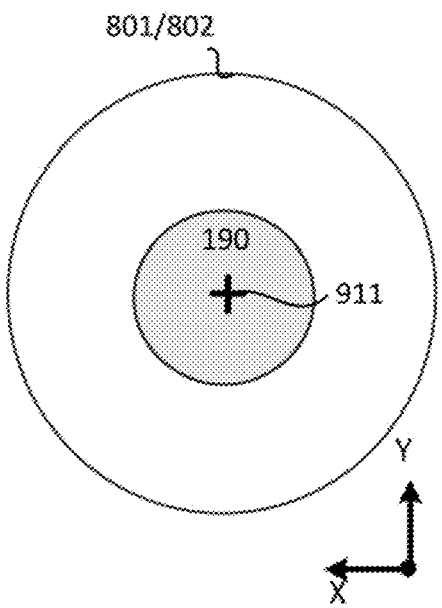
Figure 1E:
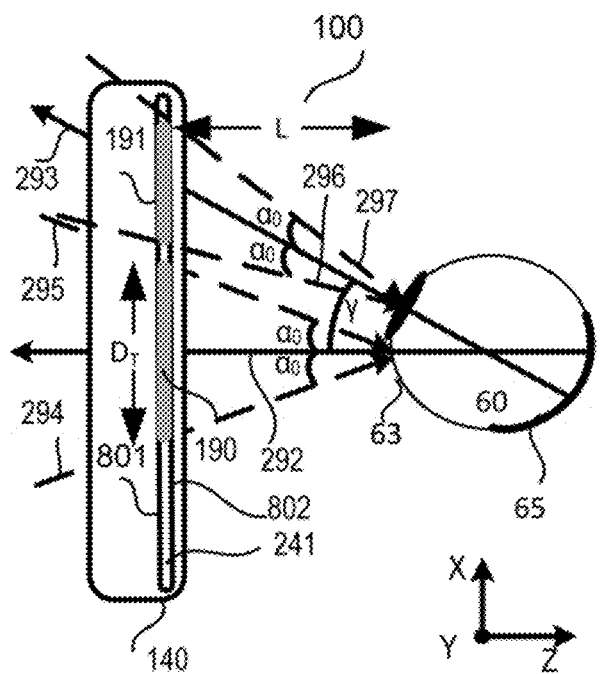

In an aspect, the positions of the LC lenses formed on the LC device (241) can be dynamically changed (e.g., electrically tunable), for example, in response to changes in the gaze directions from a gaze direction (292) to a gaze direction (293) as shown in FIGS. 1C-1F. FIGS. 1C-1F show a portion of the display system (100) that includes the vision correction optical system (140) according to an aspect of the disclosure. For purposes of clarity, certain components in the FIG. 1B are not shown in FIGS. 1C-1F. FIGS. 1C-1D show a cross-sectional view in the XZ plane and a top view in the XY plane, respectively, when the gaze direction (292) is used according to an aspect of the disclosure. In an example, the gaze direction (292) is parallel to the Z axis. FIG. 1E shows a cross-sectional view in the XZ plane and a top view in the XY plane, respectively, when the gaze direction (293) is used according to an aspect of the disclosure.

Referring to FIGS. 1C-1F, the LC device (241) can include a first substrate (801) and a second substrate (802). In an example, the first substrate (801) and the second substrate (802) are parallel. The LC device (241) can include a first electrode structure disposed on the first substrate (801). In an example shown in FIGS. 1D and 1F, the first substrate (801) has an elliptical shape or a circular shape. In an example, the LC device (241) includes a plurality of first control electrodes that are electrically coupled with the first electrode structure. A second electrode structure can be disposed on the second substrate (802). At least one second control electrode can be electrically coupled with the second electrode structure.

Figure 1F:
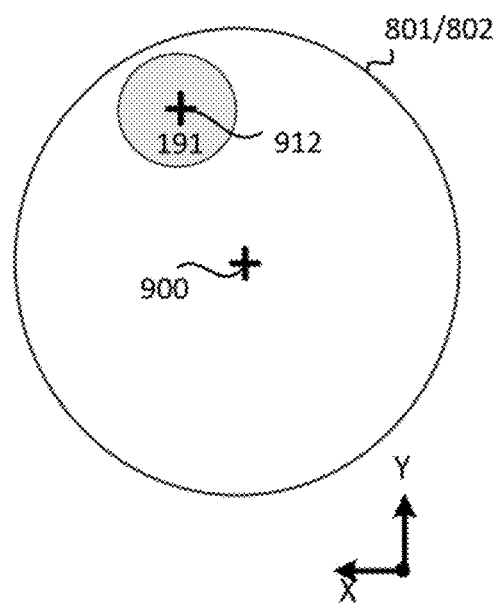

Referring to FIGS. 1C-1D, when the gaze direction (292) is used, an LC lens (190) at a position (911) can be formed when electrical signals are applied to a first subset of the plurality of first control electrodes. Referring to FIGS. 1D and 1F, the position (911) is at or close to a center (900) of the first substrate (801).

Referring to FIGS. 1E-1F, when the gaze direction (293) is used, an LC lens (191) at a position (912) can be formed when electrical signals are applied to a second subset of the plurality of first control electrodes. Thus, when the gaze direction changes from the gaze direction (292) to the gaze direction (293), the LC lens (191) can be formed at the position (912) that is different from the position (911) where the LC lens (190) was formed. The change of the position of the LC lens can be performed by applying electrical signals to a different subset of the plurality of first control electrodes, and thus can be fast and dynamic and can consume relatively small power.

The fast and dynamic change of the position of the LC lens within the LC device (241) (e.g., within the XY plane) can be beneficial. Referring to FIG. 1C, in an example, human vision may be classified into different visions depending on an angle α between a gaze direction (e.g., the gaze direction (292)) and a direction (193) from which light may come into the eye (60). The vision may be referred to a central vision when, for example, the angle α is ≤2.5°; the vision may be referred to paracentral vision when, for example, 2.5°<α≤4°; the vision may be referred to macular vision when, for example, 4°<α≤9°; the vision may be referred to near peripheral vision (or near-peripheral vision) when, for example, 9°<α≤30°; and the vision may be referred to peripheral vision when, for example, the angle α is larger than 30°. In the display system (100), the eye (60) may see clearly when the angle α is less than or equal to a threshold angle $α_0$ as compared to the vision that may not be clear when the angle is larger than $α_0$. A value of the threshold angle $α_0$ can depend on optical components of the display system (100), the application, the eye (60), and/or the like. Increasing the angle α can allow the eye (60) to see a larger visual field, however, images associated with light beams having a larger angle α can be relatively blurry compared with images associated with light beams having a smaller angle α. Thus, in some examples, there can be a tradeoff between choosing a larger angle $α_0$ for the display system (100) to increase the visual field and choosing a smaller angle $α_0$ to see clearly the objects within the visual field. The angle $α_0$ can be selected as 2.5°, 4°, 9°, 30°, or any suitable angle between 0° and 90°, for example, to balance the visual field and clarity requirements in specific applications.

In an example, an area or a diameter of the LC lens is determined (e.g., selected) based on the kind of human vision (e.g., associated with the angle $α_0$) selected for the display system (100) by considering applications and/or requirements of the display system (100). For example, light within the angle $α_0$ may be used and thus may be collected in forming images on the retina (65) of the eye (60), and light outside the angle $α_0$ may not need to be used in forming images on the retina (65) of the eye (60). Thus, in an example, a diameter of the LC lens can be larger than or equal to a diameter threshold $D_T$ so that an aperture of the LC lens can be large enough to receive the light within go into the eye (60). Referring to FIG. 1C, the diameter threshold $D_T$ can be determined based on the angle $α_0$ (e.g., 30° for the human vision to include the near peripheral vision) and a distance L between the eye (60) and the LC lens (e.g., (190)), for example, $D_T = 2 \times L \times \tan(α_0)$. In an example, L is 13 millimeters (mm), and $D_T$ is approximately 15 mm and thus the diameter of the LC lens can be at least $D_T$.

As described in detail below (e.g., FIGS. 4 and 6 and Eq. 2), in some examples, the area or the diameter of the LC lens may also depend on parameters of the LC lens, such as an optical power of the LC lens, and/or the like. In an example, a magnitude of the optical power of the LC lens increases when the diameter of the LC lens decreases. Thus, a smaller diameter can be selected for the LC lens if a larger magnitude of the optical power of the LC lens is used to perform the vision correction. According, the diameter of the LC lens may be determined (e.g., selected) based on the magnitude of the optical power of the LC lens and the diameter threshold $D_T$ where $D_T$ can be determined based on the human vision as described above. In some examples, the diameter of the LC lens may be selected as $D_T$, for example, so that light having an angle less than $α_0$ can enter the eye (60) while the magnitude of the optical power can be relatively large.

Referring to FIG. 1E, the diameter of the LC lens (190) can be $D_T$ corresponding to the angle $α_0$, and light beams received by the eye (60) can form a cone between light beams (294)-(295) that intercept with an edge of the LC lens (190).

Referring to FIGS. 1C and 1E, the gaze direction is changed from the gaze direction (292) to the gaze direction (293). Referring to FIG. 1E, the gaze direction (293) can form an angle γ with the gaze direction (292). In order for the eye (60) to have the same vision (e.g., the near peripheral vision) associated with the same angle $α_0$, light beams from a cone between light beams (296)-(297) are to enter the eye (60), and thus the LC lens (191) corresponding to the gaze direction (293) is to be positioned at the interception of the LC device (241) and the cone between the light beams (296)-(297). Referring to FIG. 1E, the LC lens (191) does not overlap with the LC lens (190). Accordingly, the LC lens (190) that was formed for the gaze direction (292) may not be used as the LC lens for the gaze direction (293). Thus, as the gaze direction changes, the position of the LC lens is to change in real-time (e.g., simultaneously or with relatively small delay) in order for the LC lens to interact with the light beams, for example, in the near peripheral vision for vision correction.

According to an aspect of the disclosure, the position of the LC lens can be changed in real time by electrically tuning as described in the disclosure. For example, when the gaze direction is the gaze direction (292), voltage signals can be applied to a first subset of the plurality of first control electrodes on the first substrate (801) such that the LC lens (190) is formed at the position (911). When the gaze direction changes from (292) to (293), voltage signals (e.g., determined by the controller (180)) can be applied to a second subset of the plurality of first control electrodes on the first substrate (801) such that the LC lens (191) is formed at the position (912). Referring to FIGS. 1B-1F, the position of the LC lens formed on the LC device (241) may be reconfigurable electrically, and thus is fast (e.g., faster than mechanically moving a lens to accommodate a change in the gaze direction). The controller (180) and/or an electrically tunable controller (281) in the display system (100) can be configured to determine which subset of the plurality of first control electrodes is to be used based on the gaze direction.

Referring to FIG. 1B, various components (e.g., the controller (180), the eye tracking system (370), the electrically tunable controller (281), and/or the like) in the display system (100) can communicate using any suitable methods, such as wireless, wired, optical, and/or the like.

Referring to FIG. 1B, the vision correction optical system (140) may be configured as a diverging lens to correct for myopia (i.e., nearsightedness) or a converging lens to correct for hyperopia (i.e., farsightedness) with a variable optical power. The vision correction optical system (140) can include one or more cylindrical LC lenses that are electrically tuned to correct for astigmatism. In some aspects, refractive optical elements (ROEs) (e.g., the one or more LC lenses) and a diffractive optical element (DOE) (e.g., a Pancharatnam-Berry (PB) Phase lens) in the vision correction optical system (140) can be electrically tuned and/or polarization controlled to correct for a chromatic aberration.

An optical power can indicate a degree to which an optical system or an optical component (e.g., a lens) converges or diverges light. In an example, the optical power of the optical component or system is equal to a reciprocal of a focal length of the optical component or system. A higher optical power indicates (i) a stronger focusing power for a converging optical component/system or (ii) a stronger diverging power for a diverging optical component/system.

In an example, to allow users to enjoy augmented reality (AR), virtual reality (VR), a mixed reality (MR), a hybrid reality, or some combination and/or derivatives thereof without prescription glasses, the vision correction optical system (140) can adjust an optical power of the vision correction optical system (140) (e.g., by adjusting optical powers of respective LC lenses) to match different prescriptions to achieve focus accommodation or dynamic focus.

Referring to FIG. 1B, in an example, a circularly polarized light incident onto the VR viewing optical system (130) is converted to a linearly polarized light by the VR viewing optical system (130). The linearly polarized light from the VR viewing optical system (130) can be incident onto the LC vision correction optical system (140) and can maintain the linear polarization. The linearly polarized light can be incident onto the eye (60).

The LC vision correction optical system (140) and the VR viewing optical system (130) can be arranged differently than that shown in FIG. 1B. In another example (not shown in FIG. 1B), the LC vision correction optical system (140) is disposed between the display device (120) and the VR viewing optical system (130).

In an example, positions of the LC vision correction optical system (140) and the VR viewing optical system (130) in the optical system (110) depends on a polarization state (e.g., light being linearly polarized, circularly polarized, or the like). In an example, one or more polarization control devices can be used to control a polarization state of the light beam in the display system (100).

In an example not shown in FIG. 1A, an eye is farsighted, and the collimated light rays (171) from the VR viewing optical system (130) can be focused onto a surface behind a retina of an eye, and thus the eye cannot see clearly the pixel A. Referring to FIG. 1B, the collimated light rays (171) from the VR viewing optical system (130) are incident onto the LC vision correction optical system (140). In an example not shown in FIG. 1B, the LC vision correction optical system (140) can be electrically tuned as a converging lens. Thus, the light rays (171) from of the LC vision correction optical system (140) can converge and can be focused onto the retina. Thus, the eye that is farsighted can see the pixel A clearly.

The LC vision correction optical system (140) can be configured to adjust an optical power of the LC vision correction optical system (140), and thus varying a focal length of the LC vision correction optical system (140). Accordingly, an optical power and a focal length of the optical system (110) can be adjusted. The LC vision correction optical system (140) or the optical system (110) can be referred to as a varifocal system. The LC vision correction optical system (140) can be configured (e.g., electrically tuned and/or polarization controlled) as a diverging lens to correct for nearsightedness or as a converging lens to correct for farsightedness with a variable optical power. The LC vision correction optical system (140) can be configured (e.g., electrically tuned) to correct for astigmatism, for example, by including cylindrical lens(es). In some aspects, the LC vision correction optical system (140) can be configured to correct for other imaging aberrations such as a chromatic aberration, for example, by using an ROE (e.g., an LC lens) and an DOE (e.g., a PB Phase lens) that have complementary optical properties, such as complementary (e.g., opposite) chromatic aberrations that can mitigate or eliminate a chromatic aberration.

Figure 1G:
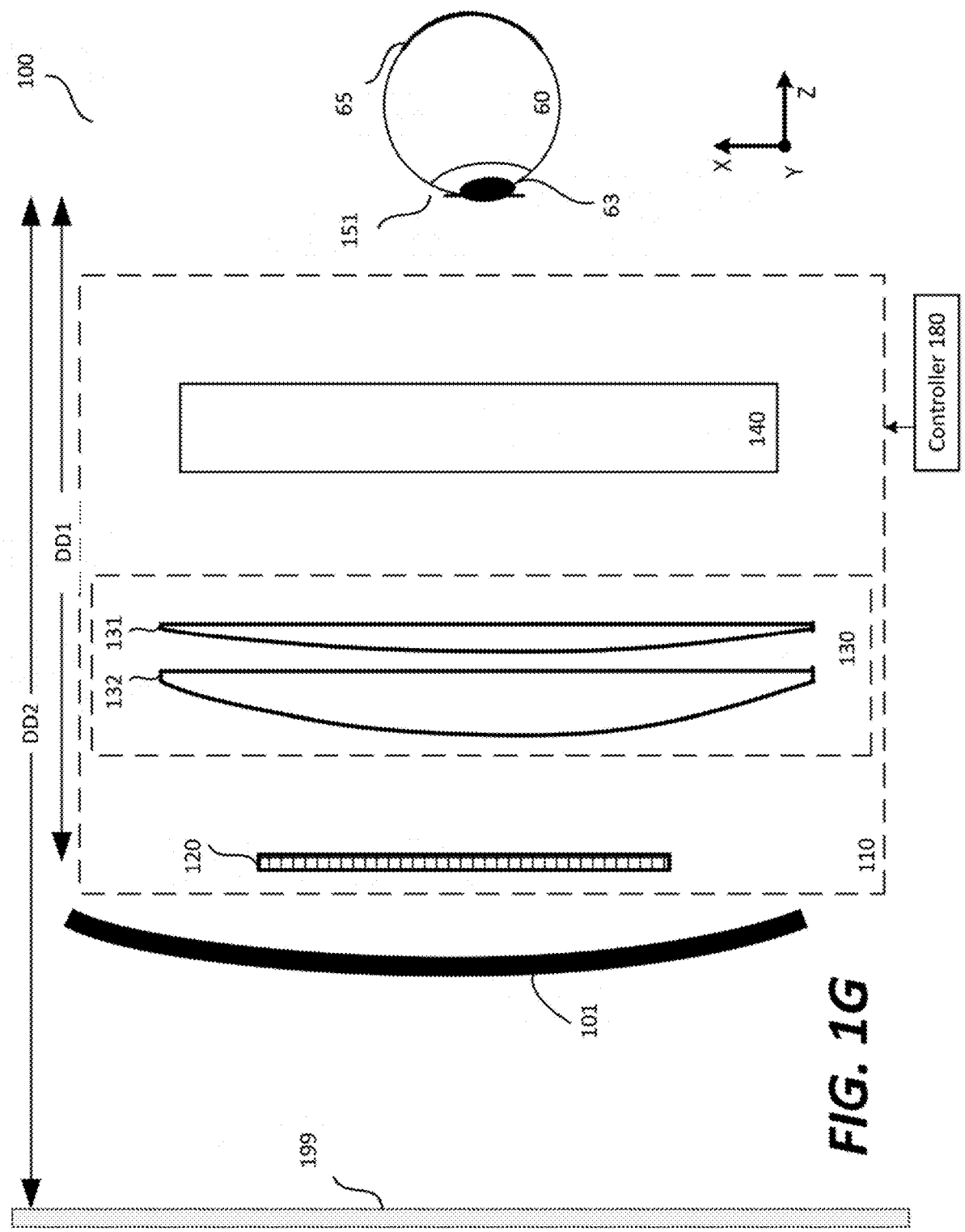
FIG. 1G shows an example of the display system according to an aspect of the disclosure.

FIG. 1G shows an example of the display system (100) corresponding to the display system (100) in FIG. 1B. The display system (100) in FIG. 1G can include the display device (120) and the LC vision correction optical system (140) (e.g., including the LC device (241)) described above with respect to FIG. 1B. The VR viewing optical system (130) can be configured to modify the light beams generated by the display device (120), and to direct the modified light beams to the area (151). In some aspects, the VR viewing optical system (130) can include diffractive elements (e.g., gratings and prisms), refractive elements (e.g., lenses), guiding elements (e.g., planar waveguides and/or fibers), and polarizing elements (e.g., polarizers, half-wave plates, quarter-wave plates, polarization rotators, a PB phase lens, and the like). In the example shown in FIG. 1G, the VR viewing optical system (130) includes ROEs such as a first lens (131) and a second lens (132). Each of the first lens (131) and the second lens (132) can have any suitable thicknesses and/or shapes (e.g., spheric shapes, aspheric shapes, and/or the like).

In the example shown in FIG. 1G, the lens (63) in the eye (60) forms an image on the retina (65) of the eye (60), and thus the eye (60) perceives an image on the display device (120) as a virtual image, such as a virtual image (199). The virtual image (199) appears at a distance DD2 from the area (151) (e.g., the eye (60)) and appears larger than the image on the display device (120). The distance DD2 is larger than a distance DD1 between the area (151) and the display device (120).

The display system (100) can be a component in a suitable artificial reality system. The artificial reality system can adjust reality in some manner into artificial reality and then present the artificial reality to a user. The artificial reality can include, e.g., a VR, an augmented reality (AR), a mixed reality (MR), a hybrid reality, or some combination and/or derivatives thereof. Artificial reality content may include completely generated content or generated content combined with captured (e.g., real objects in a real world) content. The artificial reality content may include video, audio, haptic feedback, or some combination thereof, and any of which can be presented in a single channel or in multiple channels (such as stereo video that produces a three-dimensional effect to the user). In some examples, the display system (100) can be applied to playback of live or prerecorded video.

In an aspect, a "near eye" display system can include an optical system (e.g., including one or more optical elements) that is configured to be placed within the distance threshold of an eye of a user when the display system (100) (e.g., an HMD system, or smart glasses) is utilized. Referring to FIG. 1G, the distance DD1 between the display device (120) and the area (151) (e.g., the eye (60)) can be less than or equal to the distance threshold.

The display system (100) can be a NED system implemented in various forms, such as an HMD system, smart glasses, a smart phone, and/or the like. In some examples, the artificial reality system is implemented as a standalone NED system. In some examples, the artificial reality system is implemented as a NED system connected to a host computer system, such as a server device, a console device, and the like.

The display device (120) can include a pixel array. In some examples, the pixel array includes multiple pixels arranged to form a two-dimensional surface. The two-dimensional surface of the display device (120) can be substantially flat or planar, can be curved, or can include a combination of flat and planar panels. The display device (120) can be a display panel. The display device (120) can include any suitable type(s) of display panel(s), such as a liquid crystal display (LCD) panel(s), an organic light emitting diode (OLED) panel(s), and/or the like. A resolution of the display device (120) can be defined according to pixels in the two dimensions or one of the two dimensions of the two-dimensional surface. Each pixel in the pixel array can generate a light beam. Each light beam can include a bundle of light rays in any suitable direction. For example, referring to FIG. 1B, the pixel A on the display device (120) emits a light beam including a bundle of light rays in suitable directions. The light rays (171) that is a subset of the bundle of light rays can be directed by the VR viewing optical system (130) and the LC vision correction optical system (140) to the area (151).

Figure 1H:
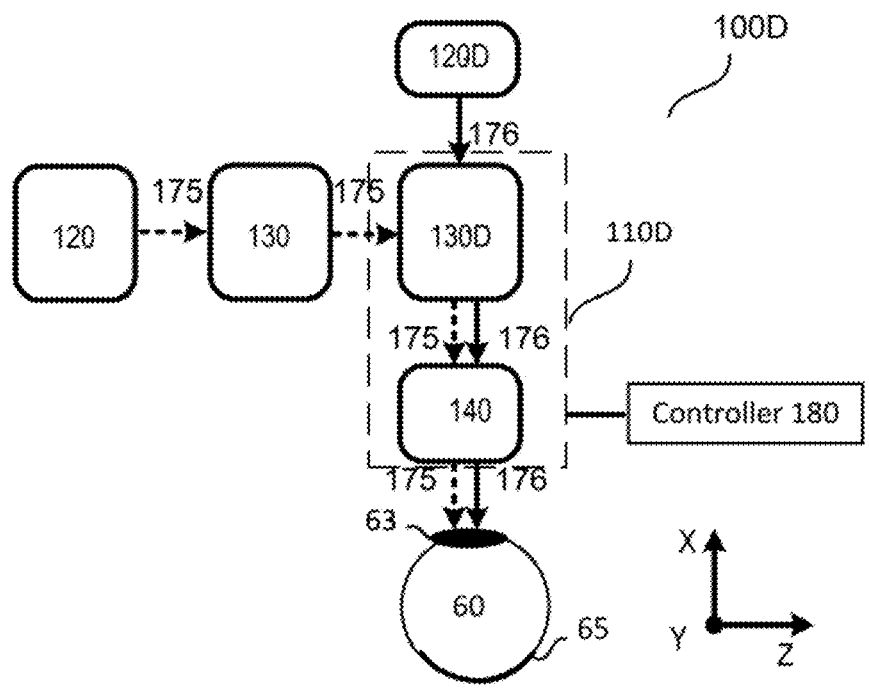
FIGS. 1H-1I show an example where a vision correction optical system is used in an augmented reality (AR) system.

The LC vision correction optical system (140) can be used in any suitable artificial reality system (e.g., a VR system shown in FIGS. 1B-1C, an AR system, a MR system, a hybrid reality system). FIG. 1H shows an example where the LC vision correction optical system (140) is used in an AR system, such as a display system (100D), according to some aspects of the disclosure. The display system (100D) includes an optical system (110D) and the controller (180). The optical system (110D) can include an AR viewing optical system (e.g., including an AR waveguide) (130D) and the LC vision correction optical system (140). In an example, the optical system (110D) can include the VR viewing optical system (130).

Waveguides can be used in AR and/or MR devices. In NEDs, optical waveguides can bend and combine light to direct the light into an eye and create virtual images seen by a user (e.g., a wearer) overlaid onto an environment.

The AR viewing optical system (130D) can combine light beams (176) (labeled with solid lines) from a real object (120D) (e.g., in a real world) and light beams (175) (labeled with dashed lines) from the display device (120). Referring to FIG. 1H, the light beams (176) are directed by the AR viewing optical system (130D) to the LC vision correction optical system (140). The light beams (175) from the VR viewing optical system (130) are directed (e.g., bent) by the AR viewing optical system (130D) to the LC vision correction optical system (140). The light beams (175) and the light beams (176) can pass through the LC vision correction optical system (140) and can be incident onto an eye, such as the eye (60) described in FIG. 1A. The optical system (110D) can be positioned within the distance threshold of an eye (e.g., the eye (60)), and the display system (100D) can be referred to as a NED system. For example, the display system (100D) is an HMD system worn by a user.

Figure 1I:
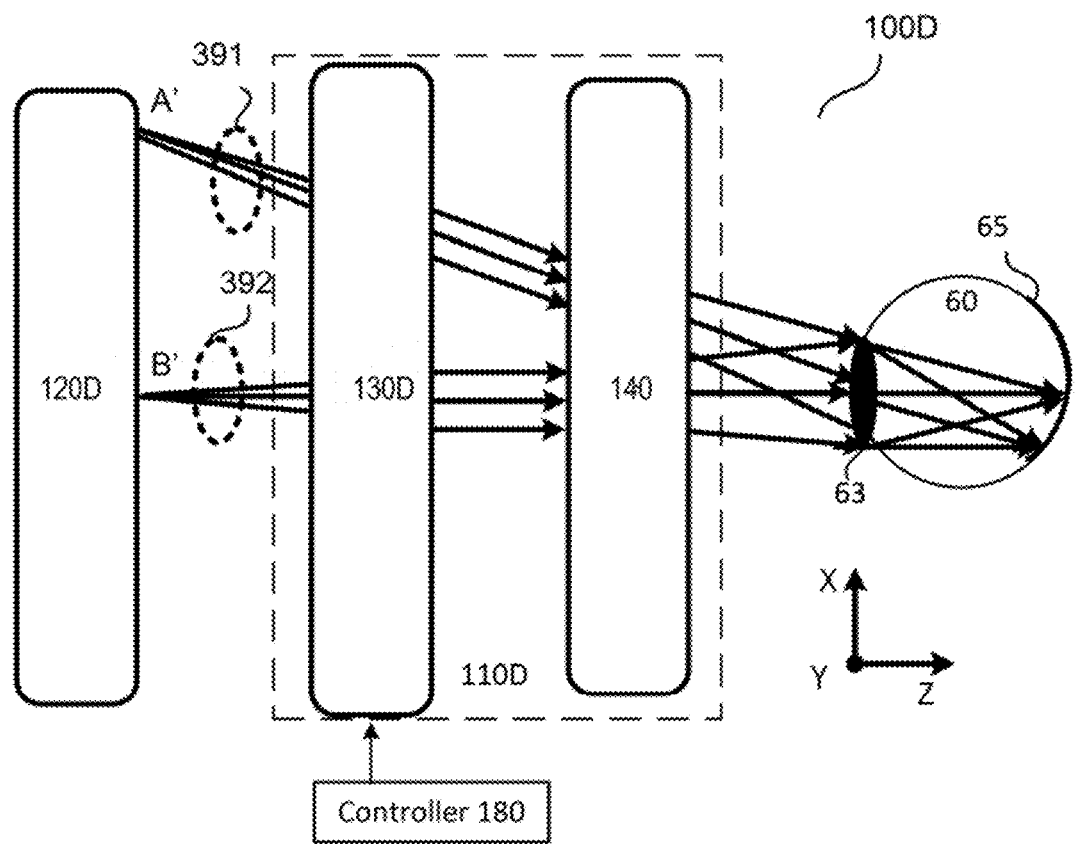

FIG. 1I shows a portion of the display system (100D) in a side view according to some aspects of the disclosure. As described above, the LC vision correction optical system (140) in the AR system (100D) can be configured to adjust an optical power of the optical system (110D), and thus varying a focal length of the optical system (110D) to correct for nearsightedness or farsightedness of the eye (60). The LC vision correction optical system (140) can be electrically tuned to correct for astigmatism and/or a chromatic aberration.

In an example, two points A' and B' from the real object (120D) emit light rays (391) and (392), respectively. The light rays (391) can become collimated after passing through the AR viewing optical system (130D). The collimated light rays (391) from the AR viewing optical system (130D) are incident onto the LC vision correction optical system (140). The LC vision correction optical system (140) can be electrically tuned as a diverging lens. Thus, the light rays (391) coming out of the LC vision correction optical system (140) diverges and can be focused onto the retina (65). Thus, the eye (60) that is nearsighted can see the point A' clearly. Similarly, the light rays (392) coming out of the LC vision correction optical system (140) diverges and can be focused onto the retina (65). Accordingly, the eye (60) can see clearly the real object (120D).

As both the light beams (175)-(176) pass through the LC vision correction optical system (140), nearsightedness or farsightedness of the eye (60), astigmatism of the eye (60), and/or a chromatic aberration can be corrected for, and the eye (60) can simultaneously see clearly the real object (120D) and the image displayed on the display device (120).

Referring to FIG. 1H, in an example, the AR viewing optical system (130D) and the VR viewing optical system (130) are combined into a viewing optical system. The display system (100D) can include the viewing optical system disposed between the display device (120) and the LC vision correction optical system (140). The viewing optical system can direct the light beams (175) from the display device (120) and the light beams (176) from the real object (120D) to the LC vision correction optical system (140).

Referring to FIGS. 1G-1I, the LC vision correction optical system (140) can include the LC device (241) that is configured to form LC lenses with different positions on the first substrate, for example, based on gaze directions of an eye of a user of the display system (100). The positions of the LC lenses can be electrically tunable, for example, in real time such as described in FIGS. 1B-1F.

LC materials and LC displays (LCDs) have been used widely, for example, in flat screen televisions, mobile phone screens, computer screens, and the like. LC materials can include birefringence materials. LC materials can be electrically controlled by applying a voltage (e.g., a relatively low voltage, such as a few volts (Vs)) to manipulate polarization or a polarization state of light, and manipulating a wavefront of the light to achieve different applications. In various aspects, LC modulation schemes can include different types including, for example, (i) intensity modulators that modulate an intensity (or light intensity) of light such as used to display information, (ii) polarization modulators used to manipulate and control polarization of light, (iii) phase modulators that manipulate a phase of light such as used in wavefront control, interferometry, DOEs, and the like. Various LC devices can include intensity modulators for intensity modulation (e.g., LCDs, Liquid crystal on silicon (LCoS)) since human eyes are sensitive to changes in light intensity and may be less sensitive to changes in light polarization and phase of light.

Figure 2:
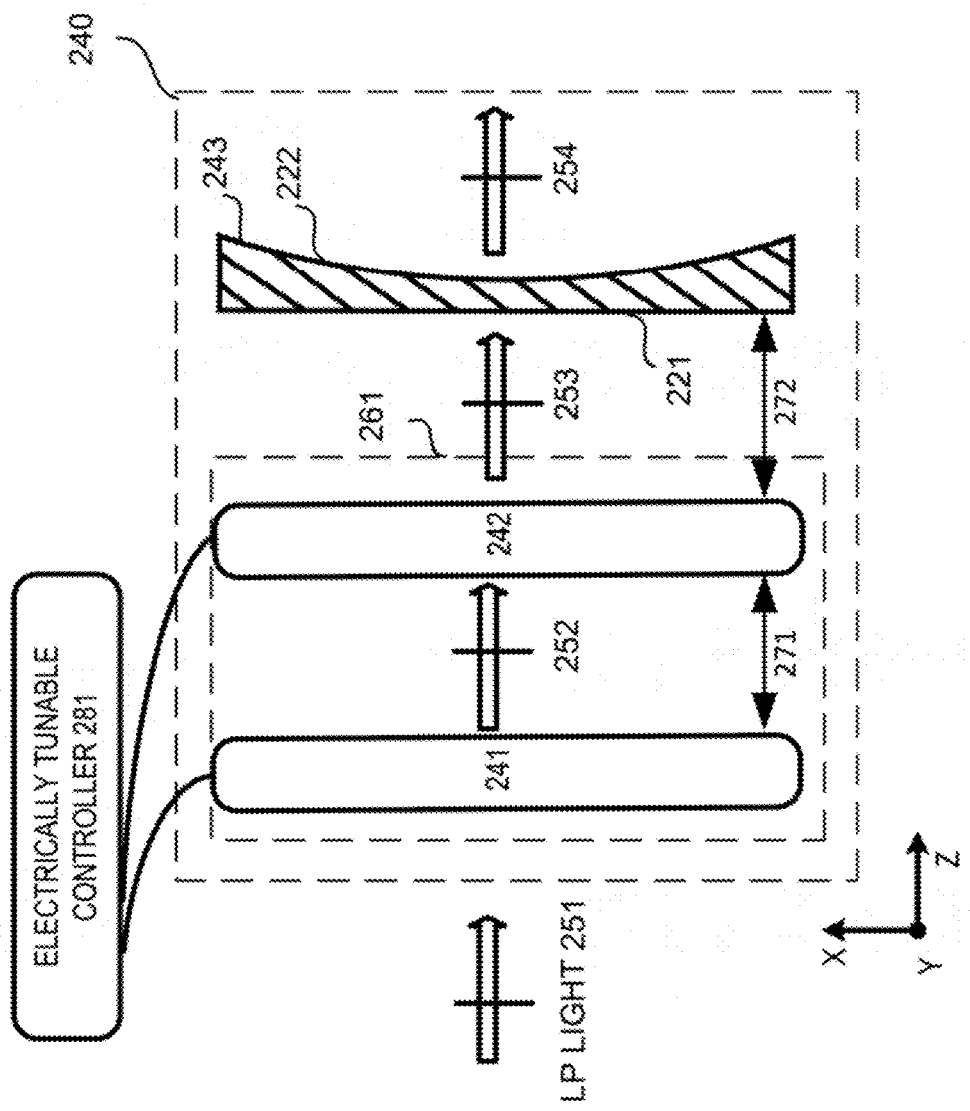
FIG. 2 shows an example of a liquid crystal (LC) vision correction optical system according to an aspect of the disclosure.

FIG. 2 shows an example of an LC optical system (e.g., an LC vision correction optical system) (240) according to an aspect of the disclosure. In an example, the LC vision correction optical system (240) is used in the display system (100) or the display system (100D) as the LC vision correction optical system (140).

Prior to describing how the LC vision correction optical system (240) can correct for (i) nearsightedness or farsightedness, (ii) astigmatism, and/or (iii) chromatic aberration, examples of nearsightedness, farsightedness, astigmatism, and chromatic aberration are described as below.

In an aspect, eye prescription information (or vision correction information) of an eye includes three parameters or three numbers of a lens or a stack of lenses: Sphere (SPH), Cylinder (CYL), and Axis. The parameter "Sphere (SPH)" can indicate an optical power (e.g., in a unit of diopter (D), such as −1D or +2D) of the lens or the lens stack used to correct for nearsightedness (or myopia) or farsightedness (hyperopia) of the eye. The parameter "Sphere (SPH)" can indicate a degree of nearsightedness or farsightedness of the eye. A "plus" (+) sign in front of the number can indicate that the eye is farsighted, and the lens or the lens stack can converge light. A "minus" (−) sign can indicate that the eye is nearsighted, and the lens or the lens stack can diverge light. The further away from zero the number on the eye prescription, the worse the eyesight and the more vision correction (e.g., a stronger prescription) that is required.

Astigmatism is a type of vision error that can occur, for example, when a cornea or a lens of the eye is irregularly shaped. Astigmatism can cause an image to appear blurry or distorted because light is not focused properly on a retina of the eye. When an eye is evenly rounded (e.g., with a ball shape), no astigmatism occurs. When the eye has an irregular shape (e.g., oval-shaped), astigmatism can occur.

Astigmatism of an eye can be indicated by a degree of the astigmatism and an orientation of the astigmatism. The parameter Cylinder (CYL) can indicate the degree of the astigmatism of the eye and can be a negative or a positive number. The parameter Cylinder (CYL) can measure in diopters the degree of the astigmatism of the eye. A bigger Cylinder (CYL) can indicate more astigmatism. The parameter Axis can be a number between 0° and 180° that can indicate the orientation of the astigmatism.

To correct astigmatism, an eyeglass prescription can specify the optical power (e.g., using the parameter Cylinder (CYL)) of the cylindrical lens, as well as the axis (e.g., using the parameter Axis) at which the cylindrical lens is to be placed. The axis can be measured in degrees, and can indicate a direction in which the cylindrical lens has the greatest power.

Chromatic aberration can indicate a failure of a lens to focus light having polychromatic wavelengths to a same point or a predefined region. Chromatic aberration can include axial (longitudinal) aberration and transverse (lateral) aberration. Axial aberration can occur when different wavelengths of light are focused at different distances from the lens (e.g., a focus shift). Longitudinal aberration can occur at long focal lengths. Transverse aberration can occur when different wavelengths are focused at different positions in the focal plane, for example, when a magnification and/or a distortion of a lens varies with wavelength. Transverse aberration can occur at short focal lengths.

Various aberrations, such as nearsightedness, farsightedness, astigmatism, chromatic aberration, and/or the like, can be corrected for by the LC vision correction optical system (240). The LC vision correction optical system (240) can include LC lens(es) and/or cylindrical LC lens(es) formed in respective LC devices, spatial light modulator(s) (SLM) (e.g., an LC SLM), PB phase lens(es), and/or the like. In an example shown in FIG. 2, aberrations, such as nearsightedness, farsightedness, astigmatism, and/or the like can be corrected. The LC vision correction optical system (240) can include the LC device (241), an LC device (242), a lens (243), and/or the like. FIG. 2 shows an example, where the LC vision correction optical system (240) includes the LC devices (241)-(242) and the lens (243). The descriptions can be suitably adapted when the LC vision correction optical system (240) includes additional lenses, such as lenses to correct nearsightedness, farsightedness, astigmatism, chromatic aberration, and/or the like. The descriptions can be suitably adapted when the LC vision correction optical system (240) includes less lenses, for example, the LC vision correction optical system (240) includes none or one of (i) the LC device (242) and (ii) the lens (243) in addition to the LC device (241).

In an aspect, one or more components (e.g., (241) and/or (242)) in the LC vision correction optical system (240) are electrically tunable (or electrically controlled), for example, by the electrically tunable controller (281). In an example, the controller (180) in FIGS. 1A-1B and 1G-1I can include the electrically tunable controller (281). The LC vision correction optical system (240) can include non-LC based optical component(s) and may not be electrically tunable. In an example, the lens (243) is a non-LC based lens. In an example, the lens (243) has a fixed optical power (e.g., −2D). In an example, the lens (243) (e.g., a glass lens) is a N-BK7 Plano-Concave lens with a diameter of 2 inches and a focal length of 500 mm. The lens (243) can have antireflection (AR) Coating for 350-700 nm. A first surface (221)

of the lens (243) is planar (e.g., plano), and a second surface (222) of the lens (243) is concave, such as shown in FIG. 2.

In an aspect, each of the LC device (241), the LC device (242), and the lens (243) is flat and thin, and the LC vision correction optical system (240) is flat and thin. The LC vision correction optical system (240) can be an ultra-compact system for vision correction including electrically tunable LC devices (e.g., (241) and (242)).

In an example, the LC vision correction optical system (240) is not tuned mechanically, and the LC vision correction optical system (240) is referred to as a non-mechanical system. For example, the LC vision correction optical system (240) is tuned using non-mechanical methods, such as tuned electrically. In other aspects, the LC vision correction optical system (240) may include a combination of electrically and mechanically tuned elements.

Referring to FIG. 2, electrically tunable LC lenses that are adaptive LC phase modulators formed in the LC device (241) and/or (242) can be combined in the LC vision correction optical system (240) for vision correction, for example, in VR and/or AR NED systems. Different functions including, for example, defocus (or a varifocal function), astigmatism correction, and/or the like can be achieved by the LC vision correction optical system (240) using LC technologies. In an example, the optical elements (241)-(242) employ LC technologies. The LC vision correction optical system (240) with a varifocal function and a dynamic adjustment of wavefront can equivalently provide spectacle prescription, for example, from −6 D to +2 D such as shown in FIG. 3 for different users by only changing applied voltages (also referred to as voltage signals), and thus reducing eye strain and fatigue from long-time use. In an example, a shape and/or a size (e.g., a radius) of each optical element in the LC vision correction optical system (240) can be the same or different. In an example, the radius of each optical element (e.g., the LC device (241), the LC device (242), or the lens (243)) in the LC vision correction optical system (240) ranges from 15 mm to 50 mm. The LC vision correction optical system (240) can have a lightweight due to a thinner thickness and a lower power consumption.

In a mechanical varifocal system, (i) lens distance(s) may be manually adjusted or (ii) voice coil actuators and flexure hinge arrays may be used. However, mechanical varifocal systems can be bulky for a VR helmet, and may feel heavy on a user's head with extended use. A combination of LC lenses and glass lens(es) may be used in place of a mechanical adjustment in the mechanical varifocal system. The combination of the LC lenses and the glass lens(es) can shift focus between different depths to achieve a smooth varifocal. In an example, the LC vision correction optical system (240) is controlled electrically and/or via polarization control, and is not controlled mechanically. The electrical and/or polarization control can allow the LC vision correction optical system (240) be more lightweight, thin, and fast-switchable. Further, the LC vision correction optical system (240) can be configured to vary a focal length as well as to correct for astigmatism and thus providing a more comprehensive vision correction.

An optical power of the LC vision correction optical system (240) can be tuned, for example, electrically by the electrically tunable controller (281). One or more optical components in the LC vision correction optical system (240) can be tuned to adjust the optical power of the LC vision correction optical system (240). In an example, a first optical power of the LC lens (e.g., (190) or (191)) formed in the LC device (241) is electrically tunable. The LC lens formed in the LC device (241) can be electrically tuned to adjust the first optical power. In an example, a second optical power of the LC lens formed in the LC device (242) is electrically tunable. An optical power of the LC vision correction optical system (240) can be based at least on a sum of the first optical power of the LC lens formed in the LC device (241) and the second optical power of the LC lens formed in the LC device (242).

The LC device (241) and the LC device (242) can be identical or different. In an example, the LC device (241) and the LC device (242) are identical, and thus an LC lens that is similar or identical to the LC lens (190) or (191) can be formed on the LC device (242), such as described in FIGS. 1B-1F. LC lenses can also be formed at different positions on the LC device (242), such as described in FIGS. 1B-1F.

Each of the first optical power and the second optical power has a same range, such as from −2D to +2D with a step or an increment that can be determined based on the voltage signals. The step can have any suitable values, such as 0.25D, 0.5D, or the like. A combined optical power of the first optical power and the second optical power can range from −4D to +4D as shown in FIG. 3. Thus, the optical power of the LC vision correction optical system (240) can range from −4D+$OP_0$ to +4D+$OP_0$ where $OP_0$ is the optical power of the lens (243). In an example, $OP_0$ is −2D, and the total optical power of the LC vision correction optical system (240) can range from −6D to +2D, as shown in FIG. 3.

In an aspect, a light beam is randomly polarized if the light beam includes a rapidly varying succession of different polarization states. A light beam can be polarized, such as linearly polarized (e.g., in a linear polarization state), circularly polarized (e.g., in a circular polarization state), elliptically polarized (e.g., in an elliptical polarization state), or the like. For the linearly polarized light, an electric field vector of the light beam is along a particular line. For the circularly polarized light, an electric field vector of the light beam rotates, e.g., clockwise or counter-clockwise as seen by an observer toward whom the light beam is propagating.

Degree of polarization (DOP) is a quantity that indicates a portion of an electromagnetic wave (e.g., a light beam) that is polarized. A perfectly polarized wave can have a DOP of 100%, and an unpolarized wave can have a DOP of 0%. A partially polarized wave can be represented by a superposition of a polarized component and an unpolarized component, and thus can have a DOP between 0 and 100%. DOP can be calculated as a fraction of a total power that is carried by the polarized component of the wave (e.g., a light beam).

A light beam can have any suitable polarization state(s) and/or DOP. In an example, the light beam is circularly polarized having a DOP of 100%, and the light beam is completely circularly polarized. In an example, the light beam is predominantly circularly polarized having a relatively large DOP that is above a threshold (e.g., 80% or above), such as a superposition of (i) a circularly polarized component and (ii) an unpolarized component and/or another polarization component. A circularly polarized light beam having a DOP of 100% or a predominantly circularly polarized light beam having a relatively large DOP can be referred to as a circularly polarized light beam below. In an example, a light beam is linearly polarized having a DOP of 100% or predominantly linearly polarized having a relatively large DOP that is above a threshold. A linearly polarized light beam having a DOP of 100% or a predominantly linearly polarized light beam having a relatively large DOP can be referred to as a linearly polarized light beam below.

Cylindrical LC lens(es) can be configured to correct for astigmatism. In an example, the LC vision correction optical system (240) includes cylindrical LC lens(es), for example, formed on the LC device (241), the LC device (242), and/or other LC devices not shown in FIG. 2. The cylindrical LC lens(es) can be electrically tunable via the electrically tunable controller (281) to correct for astigmatism.

Referring to FIG. 2, in an example, the LC device (241) and the LC device (242) are separated by a gap (271). In an example, the LC device (241) and the LC device (242) are stacked together with the gap (271) being 0. The lens (243) can be separated from an electrically tunable lens system (261) including the LC device (241) and the LC device (242) by a gap (272). In an example, the electrically tunable lens system (261) and the lens (243) are stacked together with the gap (272) being 0.

In an aspect, a light beam (e.g., an input light beam) (251) that is incident onto the electrically tunable lens system (261) is linearly polarized (LP). For example, the light beam (251) is an output light beam from the VR viewing optical system (130). The electrically tunable lens system (261) can convert the light beam (251) into the light beam (253) that is an output light beam from the electrically tunable lens system (261) incident onto the lens (243). The light beam (253) is linearly polarized. In an example, a linearly polarized light beam (254) from the lens (243) is incident onto the eye (60).

Positions of certain components in the LC vision correction optical system (240) can be interchangeable. In an example, positions of the LC device (241) and the LC device (242) are interchangeable.

In an example, a first HMD system includes a display device (e.g., the display device (120)), a VR viewing optical system (e.g., the VR viewing optical system (130)), and the LC vision correction optical system (240). Light beams from the display device can be directed to an eye by the VR viewing optical system and the LC vision correction optical system (240). The LC vision correction optical system (240) is configured to at least one of (i) correct for astigmatism of the eye or (ii) vary the optical power of the LC vision correction optical system (240). By varying the optical power of the LC vision correction optical system (240), an optical power of the first HMD system can be varied such that nearsightedness or farsightedness of the eye is corrected for, and a clear image can be formed on a retina of the eye based on an image on the display device. In an example, the VR viewing optical system is disposed between the display device and the LC vision correction optical system (240). In an example, the LC vision correction optical system (240) is disposed between the display device and the VR viewing optical system.

In an example, a second HMD system includes an AR viewing optical system (e.g., the AR waveguide (130D)) and the LC vision correction optical system (240). Light beams from a real object can be directed to an eye by the AR viewing optical system and the LC vision correction optical system (240). The LC vision correction optical system (240) is configured to at least one of (i) correct for astigmatism of the eye or (ii) vary the optical power of the LC vision correction optical system (240). By varying the optical power of the LC vision correction optical system (240), an optical power of the second HMD system can be varied such that nearsightedness or farsightedness of the eye is corrected for, and a clear image can be formed on a retina of the eye based on the real object. In an example, a light beam from the AR viewing optical system is incident onto the LC vision correction optical system (240). In an example, a light beam from the LC vision correction optical system (240) is incident onto the AR viewing optical system.

Figure 4:
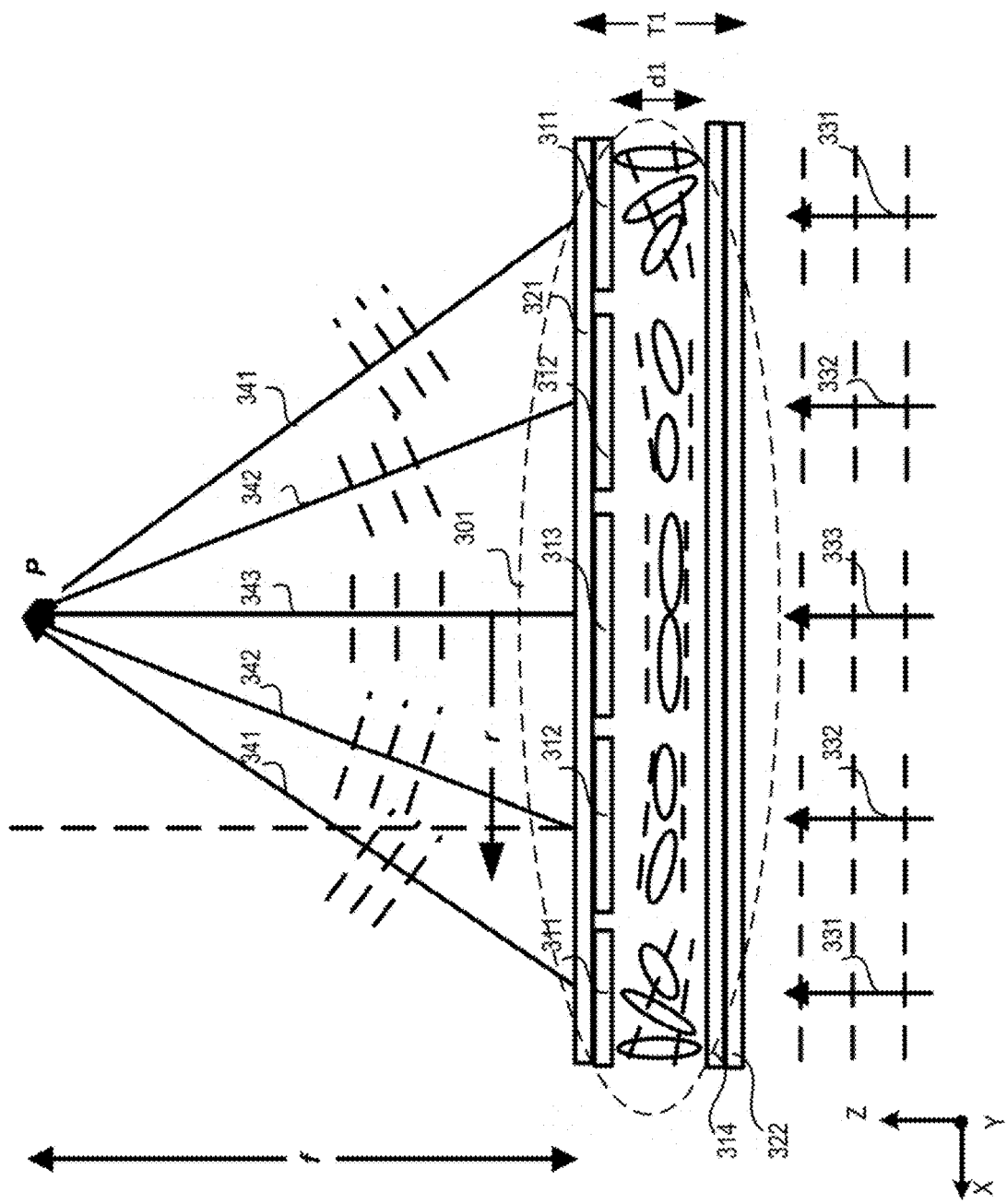
FIG. 4 shows an exemplary LC lens that is electrically tunable according to an aspect of the disclosure.

FIG. 4 shows an example of a LC lens (301) that is electrically tunable. In an example, the LC lens formed on the LC device (241) may function identically or similarly to the LC lens (301). The LC lens (301) can be a type of an ROE. The LC lens (301) can be referred to as a gradient refractive index (GRIN) lens since the LC lens (301) is based on a gradual variation of the refractive index without using a curved surface. The LC lens (301) can correct for nearsightedness or farsightedness, for example, as indicated by a parameter "Sphere (SPH)" in a spectacle prescription.

Figure 5:
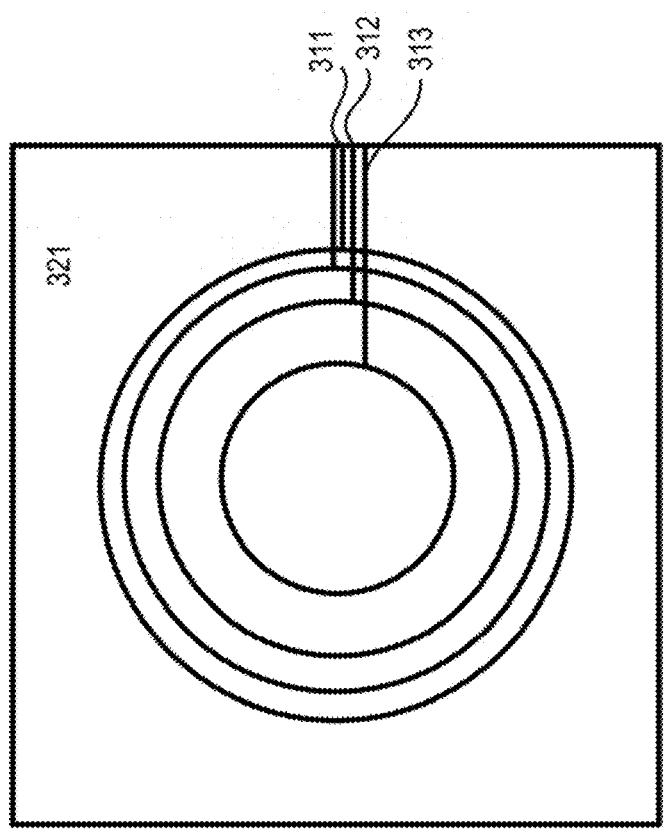
FIG. 5 shows an example of a top view of electrodes used in the LC lens according to an aspect of the disclosure.

The LC lens (301) can include a plurality of electrodes. For example, the LC lens (301) can include an electrode (e.g., a circular center electrode) (313) and one or more ring electrodes (311)-(312) disposed on a first substrate (321) and an electrode (314) disposed on a second substrate (322). FIG. 5 shows an example of a top view of the electrodes (e.g., including (311)-(313)) of the LC lens (301) disposed on a substrate, such as the first substrate (321). The electrodes can have shapes of a circle or a concentric ring.

The first substrate (321) and the second substrate (322) can be parallel to each other, for example, to the XY plane. The first substrate (321), the second substrate (322), and the electrodes (311)-(314) can be transparent. The first substrate (321) and the second substrate (322) can be flat, and thus the LC lens (301) can be flat. A thickness T1 of the LC lens (301) can be relatively small, such as less than or equal to 1 mm. The electrodes (311)-(314) can be controlled by a voltage controller, such as the electrically tunable controller (281).

The LC lens (301) can include a plurality of LC cells. Each LC cell can include a stack of (i) a transparent substrate (e.g., a glass substrate) such as the second substrate (322), (ii) a transparent electrode (e.g., indium tin oxide (ITO), such as (314)), (iii) an alignment material (e.g., polyimide) to align the LC material, (iv) an LC material (e.g., nematic LC material), (v) a transparent electrode (e.g., ITO, such as (313)), and (vi) a transparent substrate (e.g., (321)). In an example, the nematic LC material does not twist along a light path.

In an aspect, multiple voltages are applied to the respective electrodes (311)-(313) with reference to a voltage of the electrode (314) (e.g., 0V or another suitable voltage). A first voltage is applied to the electrode (311), a second voltage is applied to the electrode (312), and a third voltage is applied to the electrode (313). In an example, the electrode (311) is at an edge of the LC lens (301), and the first voltage is the largest of the multiple voltages, such as 6V. The electrode (313) is at a center of the LC lens (301), and the third voltage is the smallest of the multiple voltages, such as 0V. In an example (not shown), no electrode is formed at the center of the LC lens (301), and thus the third voltage can be 0V.

When the multiple voltages are applied to the electrodes (311)-(313), respectively, the LC materials (indicated by ovals in FIG. 4) between the respective electrodes (311)-(313) and the electrode (314) can be manipulated differently. For example, orientations of respective directors of the LC materials change in different apertures (e.g., corresponding to the electrodes (311)-(313)) of the LC lens (301), Thus, refractive indices, such as a first refractive index n1, a second refractive index n2, and a third refractive index n3 corresponding to the respective electrodes (311)-(313), can be different. In an example, the LC materials are birefringent and have two refractive indices $n_e$ and no for extraordinary and ordinary light rays, respectively. The first refractive index n1 at the edge (e.g., corresponding to (311)) of the LC lens (301) can be the smallest (e.g., $n_o$), and the third refractive index n3 at the center (e.g., corresponding to (313)) of the LC lens (301) can be the largest (e.g., $n_e$).

FIG. 4 shows an example having two ring electrodes (312)-(313). However, a number of the one or more ring electrodes can be any positive integer, such as 1, 2, or larger than 2.

Figure 6:
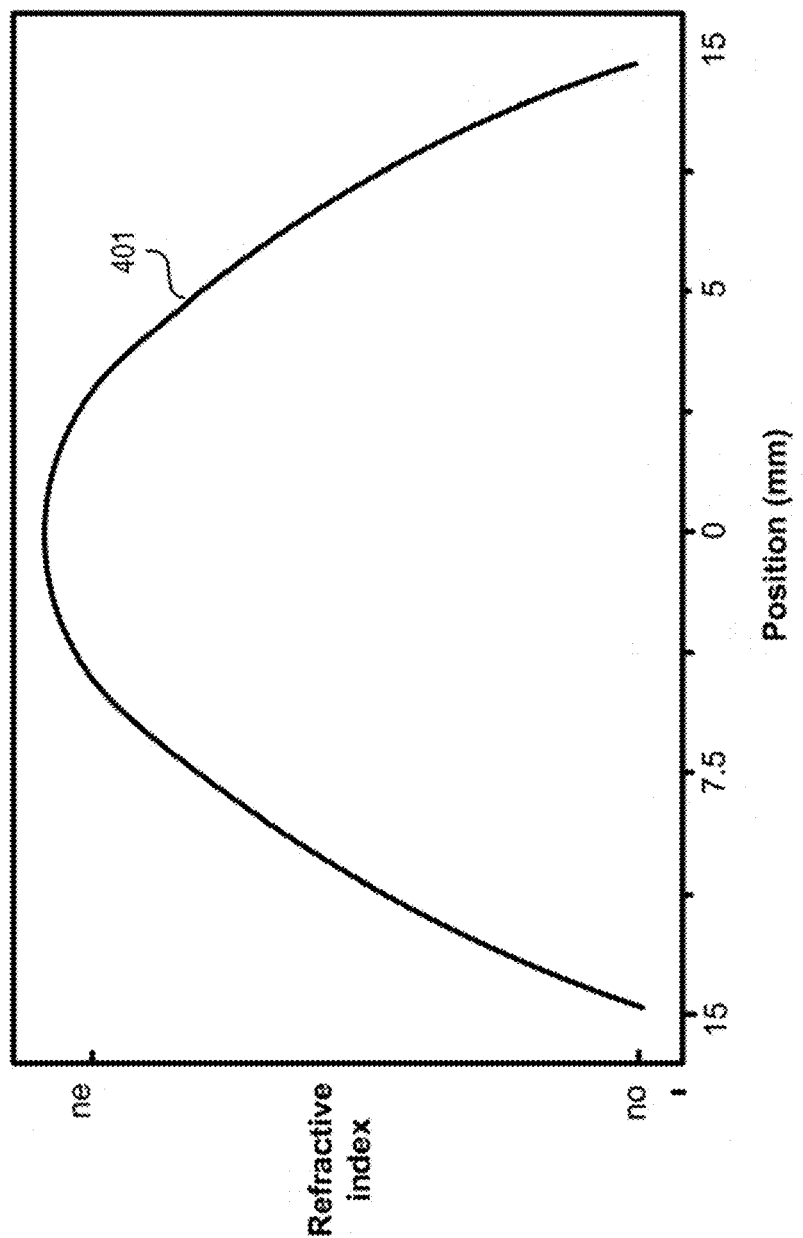
FIG. 6 shows a refractive index of an LC lens versus a position on a first substrate of the LC lens according to an aspect of the disclosure.

FIG. 6 shows a refractive index of the LC lens (301) versus a position on the first substrate (321). A position of 0 mm is at a center of the first substrate (321). When the number of the one or more ring electrodes is a relatively large number, a profile (401) indicating the refractive index of the LC lens (301) versus the position can be relatively smooth. Referring to FIGS. 4 and 6, the refractive index of the LC lens (301) can vary with a radial distance r (e.g., an absolute value of the position) from the center of the first substrate (321). The refractive index can be controlled by the respective voltages of the electrodes (311)-(313). The refractive index can be circularly symmetric in the XY plane.

Referring back to FIG. 4, a light beam (e.g., linearly polarized) can be incident onto the LC lens (301) along a direction indicated by arrows (331)-(333). The light beam can include a center portion (e.g., associated with the arrow (333)) that passes through the electrode (313) and peripheral portions (e.g., associated with the arrows (331)-(332)) that pass through the electrodes (311)-(312), respectively. Dashed lines associated with the arrows (331)-(333) can represent wavefronts of the center portion and the peripheral portions of the light beam, respectively. Due to the refractive index variation with the position shown in FIG. 4, wavefronts of the light beam within the LC lens (301) and wavefronts of the light beam exiting the LC lens (301) can be tilted as indicated by dashed lines within and outside the LC lens (301), respectively. Thus, a center portion and peripheral portions of the output light beam can be focused on a same focal point P with a focal length f, for example, measured as a distance between the focal point P and the first substrate (321). In an example, directions of the center portion and the peripheral portions of the output light beam are represented by arrows (343) and (341)-(342), respectively. The LC lens (301) can be equivalent to a lens (e.g., a convex lens) made from glass.

The profile (401) indicating the refractive index of the LC lens (301) can be aspheric, such as parabolic, in a cross section (e.g., an XY plane) through a principal axis (e.g., Y-axis) when the multiple voltages are applied as shown in FIG. 6. A phase and an optical path length (OPL) (or an optical path (OP)) of a light beam in a material can be proportional to the refractive index and a distance traveled in the material. A first phase and a first OP of the light beam in the LC lens (301) can be proportional to the refractive index and a distance d, and thus a first phase profile or a first OPL profile can have an identical shape as that of the profile (401), such as aspheric (e.g., parabolic) in the cross section (e.g., the XY plane) through the principal axis (e.g., Y-axis) when the multiple voltages are applied as shown in FIG. 6. d1 can be a distance between the electrodes (311)-(313) and the electrode (314). d1 can be a thickness of the LC lens (301) that does not include the first and the second substrates (321)-(322). A parabolic phase profile can perform better than a spherical profile when a light beam emitted by a point source is collimated by the LC lens (301) or a collimated light beam is focused by the LC lens (301). A first optical path difference (OPD), for example, between the first OP associated with a position on the first substrate (321) and a first reference OP associated with a reference position (e.g., at the edge on the first substrate (321)) can have a same shape as that of the profile (401) in FIG. 6 where the first OP and the first reference OP are in the LC lens (301). In an example, the first OPD between the first OP at the center position (e.g., 0 mm) and the first OP at the edge position is proportional to $(n_e-n_o) \times d$.

A second OPD between a second OP associated with a position on the first substrate (321) and a second reference OP associated with a reference position on the first substrate (321) has a parabolic shape where the second OP and the second reference OP are between the LC lens (301) and the focal point P. In an example, the second OPD is estimated using Eq. 1 where r indicates the radial distance.

$$\text{Second } OPD = \sqrt{r^2 + f^2} - f \approx \frac{r^2}{2f} \quad \text{(Eq. 1)}$$

In an example, a total OP that is a sum of the first OP in the LC lens (301) and the second OP from the LC lens (301) to the focal point P is the same or similar for each position on the first substrate (321), and thus different portions of the light beam can be focused onto the same focal point P.

In an example, a theoretical limit of an optical power for the LC lens (301) (e.g., a GRIN lens) can be derived based on Eq. 2.

$$\text{Optical power} = 2 \times \Delta n \times d/R^2 \quad \text{(Eq. 2)}$$

where R is a radius of the LC lens (301) that is used to converge or diverge light, the optical power (e.g., unit of diopter in $m^{-1}$) can be an inverse of the focal length f, $\Delta n$ is equal to $(n_e-n_o)$ indicating the birefringence of the LC materials. The radial distance r in Eq. 1 can be from 0 to R. In an example, the refractive index of the LC lens (301) at the edge (e.g., r=R) is $n_e$, the refractive index of the LC lens (301) at the center (e.g., r=0) is $n_o$. In an example, if a diameter (e.g., a diameter of a portion of the LC lens (301) that is used to converge or diverge light) of the LC lens (301) is 30 mm, $\Delta n$ is 0.3, and d1 is 375 microns, the optical power is estimated from Eq. 2 as $2 \times 0.3 \times 375 \times 10^{-6}/(15 \times 10^{-3})^2 = 1$ D. By reversing voltages, the LC lens (301) can become a diverging lens having the same magnitude of diopter (e.g., −1D). By adjusting the multiple voltages, a continuous varifocal manipulation between the strongest positive optical power (e.g., +1D) and the strongest negative optical power (e.g., −1D) can be achieved.

In an example, the LC materials in the LC lens (301) include rodlike molecules exhibiting positive birefringence, $n_e$ is from 1.56 to 1.89, $n_o$ is from 1.47 to 1.55, $\Delta n$ is from 0.05 to 0.45, d1 is from 5 to 400 microns, R is from 1 mm to 25 mm, and voltages are from 0 to 6 V. The electrodes (311)-(314) can be made from ITO. The first and second substrates can be made from glass, plastics, and/or any suitable material(s). In an example, the first and second substrates are glass substrates with a total thickness of 0.5 mm, and thus T1 can be from 0.5 mm to 0.8 mm. Additional material(s) (e.g., an alignment layer) may be used in the LC lens (301).

In an example, the LC vision correction optical system (240) includes the LC lens (301). In an example, the LC vision correction optical system (240) does not include the LC lens (301).

FIG. 7A shows an example of a top view of a first electrode structure (811) in an LC device (800) according to an aspect of the disclosure. FIG. 7B shows an example of a top view of a second electrode structure (812) in the LC device (800) according to an aspect of the disclosure. FIG. 7C shows an example of a cross-sectional view of the first electrode structure (811) and the second electrode structure (812) in the LC device (800) according to an aspect of the disclosure. In an example, the LC device (800) is the LC device (241) in FIGS. 1B-1F and 2. In an example, the LC device (800) is the LC device (242) in FIG. 2.

According to an aspect of the disclosure, the LC device (800) may include the first electrode structure (811) disposed on a first substrate (801). The first electrode structure (811) can be transparent. The first electrode structure (811) can include first segments (827) connected by second segments (828). For example, the first electrode structure (811) can be continuous having the alternating first segments (827) and second segments (828). The first segments (827) can have any suitable shape, such as a linear shape, a wavy shape, or a combination of different shapes. The first segments (827) can be parallel, e.g., parallel to the X axis. In an example, the first segments (827) are linear such as shown in FIG. 7A. The first segments (827) can be longer than the second segments (828). The first substrate (801) can have any suitable shape. In an aspect, the LC device (800) can have a circular shape, an elliptical shape, or the like that is compatible to other optical components in the display system (e.g., (100)), and thus may allow easy coupling to the other optical components in the display system. In an example, the first substrate (801) in the LC device (800) has the same shape (e.g., the elliptical shape, the circular shape, or the like) as that of the LC device (800). For example, if the other optical components in the display system have a circular shape, the LC device (800) having the circular shape may be coupled easily.

In an example, a region of the first substrate (801) that includes the first electrode structure (811) has the elliptic shape, the circular shape, or the like.

In an aspect, the first electrode structure (811) can have an outer boundary (821) of any suitable shape, such as an elliptical shape, a circular shape, a rectangular shape, a square, and/or the like. In an example, the second segments (828) are formed along the outer boundary (821). In an example, the first electrode structure (811) can have a substantially identical shape or a compatible shape as that of the first substrate (801). For example, the outer boundary (821) has an elliptical shape, a circular shape, or the like. The first electrode structure (811) is formed within the outer boundary (821). Referring to FIG. 7A, the first electrode structure (811) and the outer boundary (821) have a circular shape.

The LC device (800) may include first control electrode(s) such as a plurality of first control electrodes (e.g., E1-E16) that can be electrically coupled with the first electrode structure (811). For purposes of clarity, FIG. 7A shows only E1, E6, E11, and E16 in the first control electrodes E1-16. The LC device (800) may include a second electrode structure (812) disposed on a second substrate (802) that is parallel to the first substrate (801) and at least one second control electrode that can be electrically coupled with the second electrode structure (812). The plurality of first control electrodes (e.g., E1-E16) can be configured to form LC lenses with different positions. Each of the LC lenses with the different positions can be formed when electrical signals are applied to a subset of the plurality of first control electrodes that is associated with the respective LC lens. The position of the respective LC lens can vary with positions of the subset of the plurality of first control electrodes on the first substrate (801).

In some examples, the LC device (800) includes multiple first electrode structures, such as shown in FIG. 7A. The multiple first electrode structures can be identical or can be different.

Referring to FIG. 7B, in an example, the second substrate (802) has an substantially identical shape as that of the first substrate (801), such as an elliptical shape, a circular shape, or the like. The second electrode structure (812) can be transparent and include first segments (825) connected by second segments (826). In an example, the first segments (825) can be parallel. Referring to FIG. 7B, the second electrode structure (812) can be continuous having alternating first segments (825) and second segments (826). The at least one second control electrode can include a plurality of second control electrodes (e.g., C1-C16). For purposes of clarity, FIG. 7B shows only C1, C6, C11, and C16 in the second control electrodes C1-C16. The LC device (800) can include any suitable number of first control electrodes that can form electrical coupling with the first electrode structure (811) at any suitable locations. The LC device (800) can include any suitable number of second control electrodes that can form electrical coupling with the second electrode structure (812) at any suitable locations.

In an aspect, the second electrode structure (812) can have an outer boundary (822) of any suitable shape, such as an elliptical shape, a circular shape, a rectangular shape, a square, and/or the like. In an example, the second segments (826) are formed along the outer boundary (822). In an example, the second electrode structure (812) can have a substantially identical shape or a compatible shape as that of the second substrate (802). For example, the outer boundary (822) has an elliptical shape, a circular shape, or the like. The second electrode structure (822) is formed within the outer boundary (822). Referring to FIG. 7B, the second electrode structure (812) and the outer boundary (822) have a circular shape.

In an example shown in FIGS. 7A-7B, the LC device (800), the first substrate (801), the second substrate (802), the outer boundary (821) of the first electrode structure (811), and the outer boundary (822) of the second electrode structure (812) can have a circular shape.

Each of LC lenses with different positions can be formed when the electrical signals are applied to a subset of the plurality of first control electrodes (e.g., E1-E16) that is associated with the respective LC lens and electrical signals are applied to a subset of the plurality of second control electrodes (e.g., C1-C16) that is associated with the respective LC lens. The first segments (827) in the first electrode structure (811) and the first segments (825) in the second electrode structure (812) can have any suitable spatial relationship. In the example shown in FIGS. 7A-7B, the first segments (827) in the first electrode structure (811) are perpendicular to the first segments (825) in the second electrode structure (812).

In an example, referring to FIG. 7C, the LC device ((800)) includes the first substrate (801) and the second substrate (802). The first substrate (801) and the second substrate (802) can be parallel. In an example, the first substrate (801) and the second substrate (802) are parallel to the XY plane. The LC device (241) can include the first electrode structure (811) disposed on the first substrate (801) and the second electrode structure (812) disposed on the second substrate (802).

In some examples, referring to FIGS. 7A, 7B, and 7D, resistance R of one of the first segments (e.g., (827) or (825)) having a cross-sectional area As can be determined based on resistivity ρ of the one of the first segments, a length Ls of the one of the first segments, and a cross-sectional area As that is perpendicular to the length Ls. In an example, the resistance R is proportional to ρ×Ls/As. For a rectangular cross section, such as shown in FIG. 7D, the cross-sectional area As can be determined based on a thickness Ts and the width (891). The rectangular cross-sectional area shown in FIG. 7D is for illustration purposes. The first segments (827) and the first segments (825) can have any suitable cross-sectional shape, such as a rectangular shape, a circular shape, or the like. The cross-sectional area of the first segments (827) and (825) can be uniform or non-uniform. The plurality of first control electrodes (e.g., E1-E16) can be disposed on any suitable locations on the first substrate (801). The plurality of first control electrodes (e.g., E1-E16) can be disposed based on a voltage distribution (e.g., a voltage profile) over the first electrode structure (811) that is to be achieved. In an example shown in FIG. 7A, the plurality of first control electrodes (e.g., E1-E16) are disposed along the outer boundary (821) of the first electrode structure (811). The plurality of first control electrodes (e.g., E1-E16) can be equally spaced or unequally spaced along the Y axis.

Referring to FIG. 7A, lengths of the first segments (827) along the X axis can vary due to the shape of the first electrode structure (811), such as an elliptical shape or a circular shape. For example, the first segments (827) (e.g., the first segment (827(*a*)) and the first segment (827(*b*))) near the top and the bottom of the first electrode structure (811) may be shorter along the X axis than the first segments (e.g., (827(*c*))) near the middle of the first electrode structure (811).

In some examples, a difference between (i) a first resistance between a first adjacent pair (e.g., E1 and E2) of the plurality of first control electrodes and (ii) a second resistance between a second adjacent pair (e.g., E2 and E3) of the plurality of first control electrodes is less than a threshold (e.g., the difference is 1%, 5%, 10%, or the like of the first resistance), for example, such that the voltage distribution over the first length between the first adjacent pair (e.g., E1 and E2) can be identical or similar to the voltage distribution over the second length between the second adjacent pair (e.g., E2 and E3). In an example, the first resistance between the first adjacent pair (e.g., E1 and E2) of the plurality of first control electrodes and the second resistance between the second adjacent pair (e.g., E2 and E3) of the plurality of first control electrodes are identical. Various designs for the first electrode structure (811) can be used to achieve the same resistance between adjacent pairs of the plurality of first control electrodes. The first resistance can have any suitable numeric values, such as 1 mega-ohms (MΩ), 1-3 MΩ, or the like.

In an example, the first segments (827) have a cross sectional area As and a resistivity p, and a first length along the first electrode structure (811) between the first adjacent pair (e.g., E1 and E2) of the plurality of first control electrodes may be equal to a second length along the first electrode structure (811) between the second adjacent pair (e.g., E2 and E3) of the plurality of first control electrodes. Thus, in an example, the first resistance between the first adjacent pair (e.g., E1 and E2) can be the same as the second resistance between the second adjacent pair (e.g., E2 and E3) and the voltage distribution over the first length between the first adjacent pair (e.g., E1 and E2) can be identical or similar to the voltage distribution over the second length between the second adjacent pair (e.g., E2 and E3). In an example, a distance between E1 and E2 along the Y axis is larger than a distance between E2 and E3 along the Y axis when the first length along the first electrode structure (811) between E1 and E2 is equal or similar to the second length along the first electrode structure (811) between E2 and E3.

Referring to FIG. 7A, a resistance between two control electrodes E1 and E6 can be the same as a resistance between two control electrodes E6 and E11, and a distance between E1 and E6 along the Y axis can be larger than a distance between E6 and E11 along the Y axis since an average length (along the X axis) of the first segments between E1 and E6 can be shorter than an average length (along the X axis) of the first segments between E6 and E11.

In an aspect, the cross-sectional areas As and/or the resistivities p of the first segments (827) can be different along the first electrode structure (811) to compensate for the average length variations of the first segments (827).

In an example, the resistivities p of the first segments (827) can be the same, and the first segments (827) (e.g., the first segment (827(*a*)) and the first segment (827(*b*))) near the top and the bottom of the first electrode structure (811) can have smaller cross sectional areas As than cross-sectional areas As of the first segments (e.g., (827(*c*))) near the middle of the first electrode structure (811) such that the first resistance between the first adjacent pair (e.g., E1 and E2) can be the same as the second resistance between the second adjacent pair (e.g., E2 and E3).

In an example, the cross-sectional areas As of the first segments (827) can be the same. The first segments (827) (e.g., the first segment (827(*a*)) and the first segment (827(*b*))) near the top and the bottom of the first electrode structure (811) can have larger resistivities p than the resistivities p of the first segments (e.g., (827(*c*))) near the middle of the first electrode structure (811) such that the first resistance between the first adjacent pair (e.g., E1 and E2) can be the same as the second resistance between the second adjacent pair (e.g., E2 and E3).

The plurality of second control electrodes (e.g., C1-C16) can be disposed on any suitable locations on the second substrate (802). In an example shown in FIG. 7B, the plurality of second control electrodes (e.g., C1-C16) are disposed on the outer boundary (822) of the second electrode structure (812). The description of the distribution of the plurality of first control electrodes (e.g., E1-E16) can be suitably applied to the distribution of the plurality of second control electrodes (e.g., C1-C16). For example, the resistivities p, the cross-sectional areas, and lengths along the second electrode structure (812) between adjacent pairs of the plurality of second control electrodes (e.g., C1-C16) can be set such that a first resistance between a first adjacent pair (e.g., C1 and C2) of the plurality of second control electrodes and a second resistance between a second adjacent pair (e.g., C2 and C3) of the plurality of second control electrodes can be identical or similar. Thus, the voltage distribution over the first length between the first adjacent pair (e.g., C1 and C2) can be identical or similar to the voltage distribution over the second length between the second adjacent pair (e.g., C2 and C3). Similar to the LC lens (301), the LC device (800) can include a stack of a transparent substrate (e.g., the first substrate (801)), an alignment material (e.g., polyimide) to align an LC material, the LC material (e.g., nematic LC material), and a transparent substrate (e.g., the second substrate (802)) that are described in FIG. 4.

A difference between the LC device (800) and the LC lens (301) can include that the LC lens (301) uses electrodes (e.g., (311)-(314)), and the LC device (800) uses the first electrode structure (811) and the second electrode structure (812) as electrodes. The first electrode structure (811) and the second electrode structure (812) can be formed using suitable transparent and conductive materials. In an example, resistivity ρ of the first electrode structure (811) and the second electrode structure (812) ranges from 0.001 to 0.1 ohm-meters. In an example, ITO is used to form the first electrode structure (811) and the second electrode structure (812).

In an example, referring to FIG. 7A, the width (891) of the first segments (e.g., (827) and/or (825)) can range from 1 to 100 microns such as from 5 to 35 microns. A gap (892) between adjacent segments of the first segments (e.g., (827) and/or (825)) can range from 1 to 10 microns such as from 3 to 5 microns. A period (893) can be a sum of the width (891) and the gap (892). In an example, referring to FIGS. 7A and 7C, the period (893) is equal to a thickness d2 of an LC layer in the LC device (800). The LC layer in the LC device (800) can include materials, such as the alignment material to align the LC material and the LC material, between the first substrate (801) and the second substrate (802). The thickness d2 of the LC layer in the LC device (800) can be identical to or different from the thickness d1 shown in FIG. 4. In an example, the period (893) and the thickness d2 of the LC layers in the LC device (800) can range from 8 to 40 microns. The first electrode structure (811) and the second electrode structure (812) can have any suitable thicknesses Ts such as shown in FIG. 7D. In an example, the thickness Ts ranges from 10 nanometers (nm) to 100 nm. In some examples, a dimension (e.g., diameters d3 and d4 as shown below in FIGS. 8A-8B) of the LC lens that is formed in the LC device (800) can range from 1 millimeter (mm) to 20 mm, such as 15 mm in some applications.

In an example, resistivity of the electrodes (e.g., (311)-(314)) in the LC lens (301) can be less than resistivity of the first electrode structure (811) and resistivity of the second electrode structure (812). For example, the resistivity of the first electrode structure (811) can range from 0.001 to 0.1 ohm-meters.

Electrical signals (e.g., voltage signals) that are applied to the plurality of first control electrodes and/or the plurality of second control electrodes can include phase shifted signals such as phase shifted AC signals, which can be different from the voltages used in the LC lens (301). The resulting phase pattern (e.g., OPD), from different activated areas can simulate that of a dynamic LC lens depending on the applied AC voltage parameters. The AC voltage parameters can include an amplitude, a frequency, a root mean square (RMS) voltage, a phase shift, and/or the like. The AC voltage parameters can be adjusted based on wavefront requirements for applications.

FIGS. 8A-8B show examples of LC lenses formed in different regions in an LC device (e.g., the LC device (800)) according to an aspect of the disclosure. A position of the LC lens formed in the LC device (800) can vary with positions of the subset of the plurality of first control electrodes on the first substrate (801) and/or positions of the subset of the plurality of second control electrodes on the second substrate (802). In an example, an area (or a dimension) of the LC lens formed in the LC device (800) can vary with the respective position of the LC lens, and the area of the LC lens is larger than or equal to an area threshold (or a dimension threshold). In an example, the variation of the area of the LC lens with respect to the respective position of the LC lens can be within a range (e.g., 5% of the area, 10% of the area, or the like).

In an example, the LC device (800) is the LC device (241). Referring to FIGS. 1D and 8A, the LC lens (190) can be formed at the position (911) when electrical signals (e.g., voltage signals) are applied to a subset (e.g., E6 and E11) of the plurality of first control electrodes and/or to a subset (e.g., C6 and C11) of the plurality of second control electrodes. In an example, voltage signals applied to the subset of the plurality of first control electrodes and/or the subset of the plurality of second control electrodes such as E6, E11, C6, and C11 are phase-shifted AC signals with respective phases as 0, π, π/2, and π/2. A voltage distribution (e.g., a voltage change) from one control electrode (e.g., E6) to another control electrode (e.g., E11) can depend on the phase-shifted AC signals including but not limited to an amplitude, a frequency, a root mean square (RMS) voltage, phase shift(s) among the AC signals (e.g., 0, π, π/2, and π/2). The voltage distribution (e.g., the voltage change) from the one control electrode (e.g., E6) to the other control electrode (e.g., E11) can be linear or nonlinear. In an example, the voltage distribution is linear or approximately linear.

The position (911) of the LC lens (190) can depend on positions of the subset (e.g., E6 and E11) of the plurality of first control electrodes on the first substrate (801) and/or positions of the subset (e.g., C6 and C11) of the plurality of second control electrodes on the second substrate (802). Referring to FIG. 8A, the position (911) along the X axis can depend on the positions of the subset (e.g., C6 and C11) of the plurality of second control electrodes on the second substrate (802). The position (911) along the Y axis can depend on the positions of the subset (e.g., E6 and E11) of the plurality of first control electrodes on the first substrate (801).

Referring to FIGS. 1F and 8B, the LC lens (191) can be formed at the position (912) when electrical signals (e.g., voltage signals) are applied to a subset (e.g., E2 and E7) of the plurality of first control electrodes and/or to a subset (e.g., C4 and C9) of the plurality of second control electrodes. In an example, voltage signals applied to the subset of the plurality of first control electrodes and/or the subset of the plurality of second control electrodes such as E2, E7, C4, and C9 are phase-shifted AC signals with respective phases as 0, π, π/2, and π/2. The position (912) of the LC lens (191) can depend on positions of the subset (e.g., E2 and E7) of the plurality of first control electrodes on the first substrate (801) and/or positions of the subset (e.g., C4 and C9) of the plurality of second control electrodes on the second substrate (802).

Referring to FIGS. 8A-8B, in an example, a resistance between the two control electrodes E6 and E11 can be the same as a resistance between the two control electrodes E2 and E7, and a resistance between the two control electrodes C6 and C11 can be the same as a resistance between the two control electrodes C4 and C9. When the respective voltages signals are applied to the respective control electrodes to form the LC lenses (190)-(191), optical properties of the LC lenses (190)-(191) can be identical or similar, for example, the LC lenses (190)-(191) have identical or similar optical powers (e.g., the optical powers are within 5% or 10% of each other).

In an example, the first segments (827) and (825) have the cross-sectional area As and the resistivity ρ. A first length along the first electrode structure (811) between E6 and E11 is equal or similar to a second length along the first electrode structure (811) between E2 and E7 (e.g., within 5% or 10% of each other), and a distance (e.g., d3 in FIG. 8A) between E6 and E11 along the Y axis is less than a distance (e.g., d4 in FIG. 8B) between E2 and E7 along the Y axis. A first length along the second electrode structure (812) between C6 and C11 is equal or similar to a second length along the second electrode structure (812) between C4 and C9 (e.g., within 5% or 10% of each other), and a distance (e.g., d5 in FIG. 8A) between C6 and C11 along the X axis is less than a distance (e.g., d6 in FIG. 8B) between C4 and C9 along the X axis. In an example, an area of the LC lens (190) is less than an area of the LC lens (191), and the LC lenses (190)-(191) are larger than or equal to the area threshold such that light within a certain vision (e.g., the vision that satisfies requirements of the display system, such as defined using the angle $\alpha_0$ shown in FIGS. 1C and 1E) can pass through the LC lenses (190)-(191).

In an example, the cross-sectional areas As and/or the resistivities p of the first segments (827) can be different along the first electrode structure (811) to compensate for the average length variations of the first segments (827). Similarly, the cross-sectional areas As and/or the resistivities p of the first segments (825) can be different along the second electrode structure (812) to compensate for the average length variations of the first segments (825) along the X axis. In an example, the distance d3 between E6 and E11 along the Y axis can be identical or similar to the distance d4 between E2 and E7 along the Y axis (e.g., within 5% or 10% of each other), and the distance d5 between C6 and C11 along the X axis can be identical or similar to the distance d6 between C4 and C9 along the X axis (e.g., within 5% or 10% of each other). In an example, the area of the LC lens (190) can be identical or similar to the area of the LC lens (191), and the LC lenses (190)-(191) are larger than or equal to the area threshold.

In some examples, the first resistance between the first adjacent pair (e.g., E1 and E2) of the plurality of first control electrodes and the second resistance between the second adjacent pair (e.g., E2 and E3) of the plurality of first control electrodes can be different, and the resistance between E6 and E11 and the resistance between E2 and E7 can be different. Similarly, the resistance between C6 and C11 and the resistance between C4 and C9 can be different. In an example, to form the LC lenses (190)-(191) having identical or similar optical properties, the voltage signals to be applied to E2, E7, C4, and C9 can be adapted from the corresponding voltages applied to E6, E11, C2, and C11.

Figure 9:
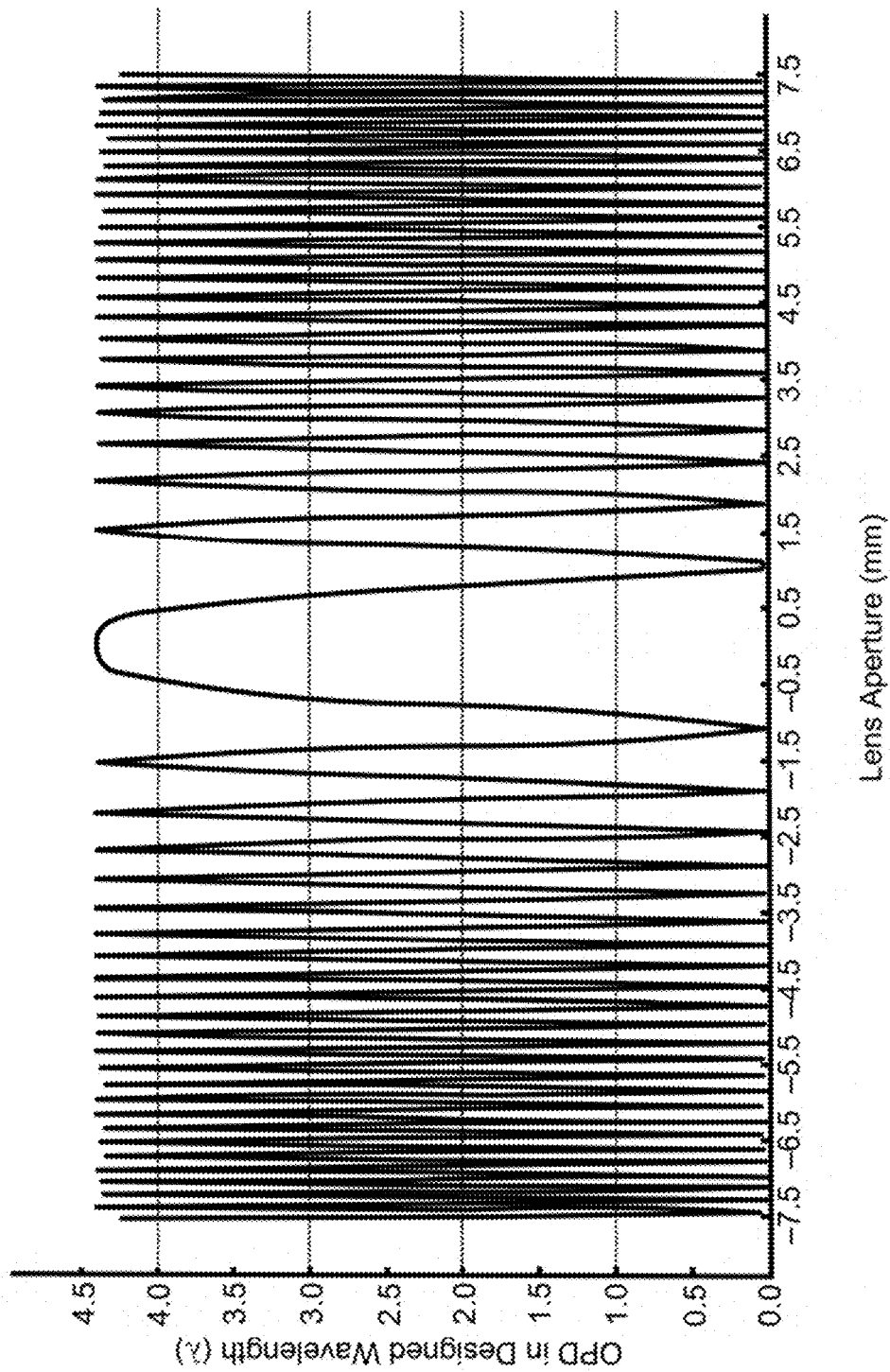
FIG. 9 shows an example of a relationship between an optical path difference and position according to an aspect of the disclosure.

FIG. 9 shows an example of a relationship between OPD (unit: wavelength 2) and position (e.g., lens aperture) according to an aspect of the disclosure. In an example shown in FIG. 9, a number of times that the phase resets is 24, and thus a thickness (also referred to as a cell gap) d of the LC lens is equivalent to 24×d in Eq. 2. In an example, d is 8 microns, $\Delta$n is 0.3, the diameter of the LC lens is 15 mm (i.e., a radius R is 7.5 mm). Accordingly, the equivalent distance is 192 microns (e.g., 24×8 microns). The maximal optical power of the LC lens (e.g., (190) or (191)) formed in the LC device (241) can be calculated using Eq. 2 as $2 \times 0.3 \times 8 \times 10^{-6} \times 24/(7.5 \times 10^{-3})^2$, which is about 2D. In an example, a total thickness that includes thicknesses of the first substrate (801) and the second substrate (802) is 0.5 mm or less than 1 mm.

By reversing the voltage (e.g., voltage signals), the display system (100) can obtain equivalent diopter magnitudes in both the positive and negative directions, and thus can provide a range of −2D to +2D diopters with a thickness of 0.5 mm. Further, the display system (100) can perform continuous varifocal adjustments between the bounds (e.g., −2D to +2D), e.g., in precise increments of 0.25 D or less. The increment or step can be adjusted depending on applications and user requirements.

In an example, the thickness (or the cell gap) of 8 microns is a size that can be fabricated using LCD facilities for mass production, thereby simplifying the mass production of the LC device (800). As described above, the phase resets of 24 may be equivalent to a thickness of 192 microns for the LC lens. A response time can be reduced by a factor of 576 (e.g., $24^2$) since the response time can be proportional to the square of the LC cell thickness. Thus, the current response time can be reduced to approximately 16 millisecond, which is about 60 Hz fresh rate), allowing for a rapid response to eye tracking during operation.

In an example, the LC device (e.g., the first substrate and the second substrate) can have the elliptic shape (e.g., the circular shape), and the first electrode structure (e.g., an outer boundary of the first electrode structure) and the second electrode structure (e.g., an outer boundary of the second electrode structure) can have a rectangular shape, a square shape, or the like.

In an example, the LC device (e.g., (241)) can have a shape that is different from the elliptic shape (e.g., a circular shape) shown in FIGS. 1D, 1F, and 7A-7C. The LC device (e.g., (241)) can have a rectangular shape, a square shape, or the like. For example, the first substrate and the second substrate can have a rectangular shape (e.g., a square). The outer boundary of the first electrode structure and the outer boundary of the second electrode structure can have a rectangular shape (e.g., a square shape).

In an example, the LC device (e.g., the first substrate and the second substrate) can have a rectangular shape (e.g., a square shape), and the first electrode structure (e.g., an outer boundary of the first electrode structure) and the second electrode structure (e.g., an outer boundary of the second electrode structure) can have an elliptical shape (e.g., a circular shape), or the like.

In an example, such as shown in FIGS. 7A-7C and 8A-8B, the first and second electrode structures can be patterned. In an example, one of the first electrode structure and the second electrode structures can be patterned such as shown in FIGS. 7A-7C and 8A-8B, and the other one of the first electrode structure and the second electrode structures is not patterned, for example, similar to the electrode (314) shown in FIG. 4.

In an example, an LC lens formed in the LC device (241) or (800) can function as the LC lens (301). In an example, an LC lens formed in the LC device (241) or (800) can function as a cylindrical LC lens by (i) controlling the voltage signals applied to the first control electrodes and/or the second control electrodes, (ii) using different arrangement(s) and/or designs for the first electrode structure and/or the second electrode structure, and/or the like.

Figure 10:
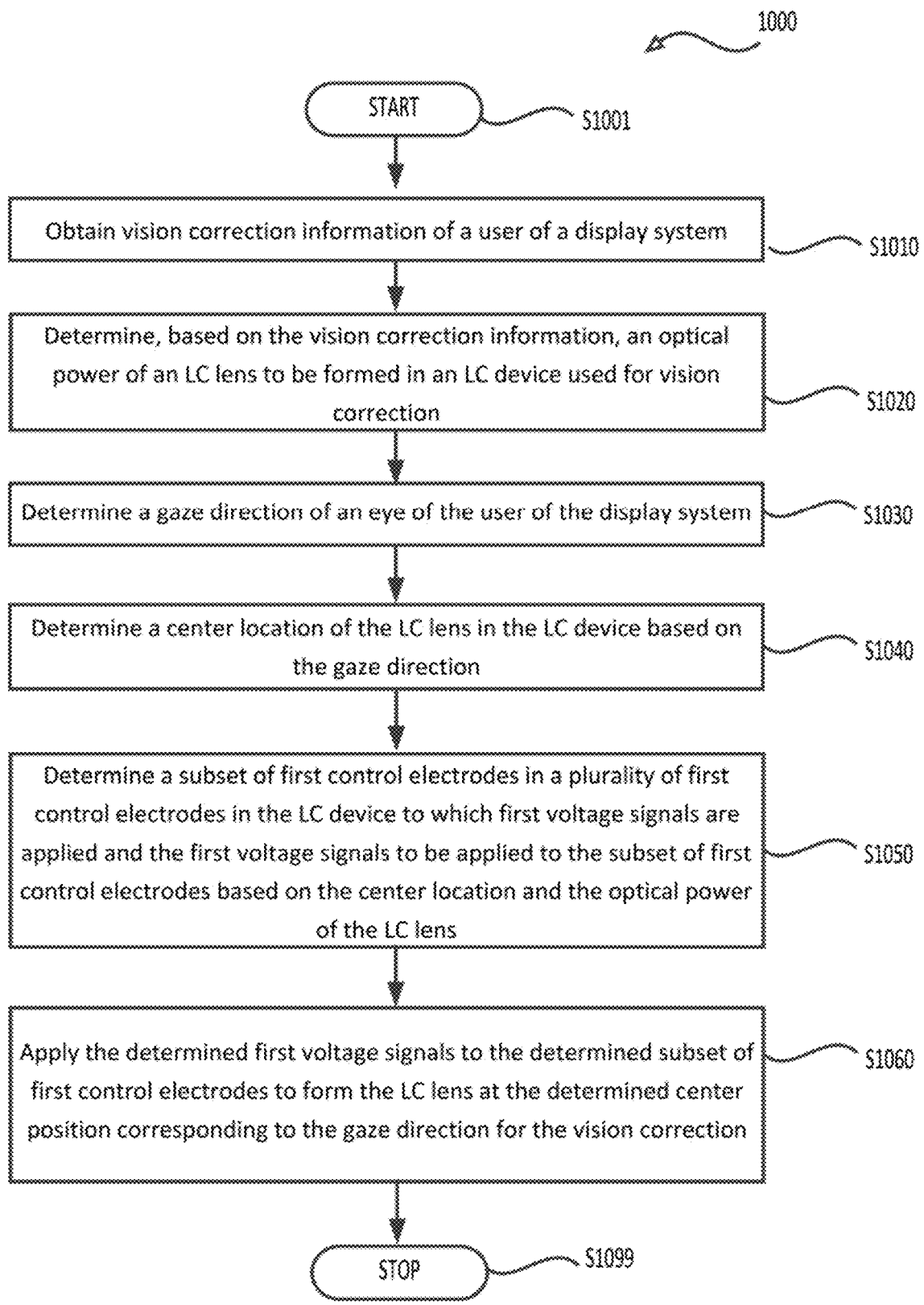
FIG. 10 shows a flow chart outlining a process according to some aspect of the disclosure.

FIG. 10 shows a flow chart outlining a process (e.g., a vision correction process) (1000) according to some aspect of the disclosure. In an example, a display system or an HMD system, such as the display system (100) or (100D) includes a vision correction optical system (e.g., the LC vision correction optical system (240)) and a viewing optical system (e.g., the viewing optical system (130) or (130D)), such as described above. The viewing optical system can be configured to direct light beams from a display device or a real object to an eye of a user of the display system, such as described in FIGS. 1A-1B and 1G-1I.

In various examples, multiple users can use the display system. In an example, a user with changing eye prescription information can use the display system. Thus, the display system is to be adapted to different eye conditions corresponding to different eye prescription information. In an aspect, the vision correction process (1000) can be implemented to tune (e.g., electrically and optionally via controlling a polarization) the vision correction optical system based at least on an eye condition of the user. The vision correction process (1000) can correct for nearsightedness/farsightedness, astigmatism, chromatic aberration, additional aberration(s), and/or the like. The vision correction optical system can be configured to correct for nearsightedness or farsightedness, astigmatism, chromatic aberration, and/or the like. The vision correction optical system can include one or more LC devices (e.g., (241), (242), (800)). In an example, the vision correction optical system can include one or more non-LC based lens such as a lens (e.g., the lens (243)) formed by glass. In an example, the vision correction process is executed by processing circuitry, such as processing circuitry in the controller (180). The process (1000) starts at step (S1001) and proceeds to step (S1010).

At step (S1010), vision correction information (or eye prescription information) to be used by the vision correction optical system, such as the vision correction information of a user of the display system, can be obtained. The vision correction information can include information indicated by one or more of the parameter Sphere (SPH), the parameter Cylinder (CYL), and the parameter Axis, as described above. The parameter Sphere (SPH) can indicate nearsightedness or farsightedness. The parameter Cylinder (CYL) and the parameter Axis can indicate astigmatism. The vision correction information can be eye prescription information of the user.

At step (S1020), respective optical power(s) of lens(es) in the vision correction optical system (e.g., (140) or (240)) can be determined based on the vision correction information. In an example, the vision correction optical system includes one or more LC devices (e.g., (241), (242), and/or the like), and LC lens(es) with tunable optical power(s) can be formed on the respective one or more LC devices. Thus, optical power(s) of the LC lens(es) to be formed on the respective one or more LC devices are determined based at least on the vision correction information.

In an example, the vision correction optical system further includes lens(es) having fixed optical power(s), such as the lens (243). The optical power(s) of the LC lens(es) to be formed on the respective one or more LC devices can be determined based on the vision correction information and the optical power(s) of the lens(es) having the fixed optical power(s).

In an example, the vision correction optical system includes lens(es) (e.g., a PB phase lens) having fixed magnitude(s) of optical power(s) with tunable signs. For example, the vision correction optical system includes a PB phase lens. The optical power of the PB phase lens has a magnitude of $OP_{PB}$, and thus the optical power of the PB phase lens can be $-OP_{PB}$ or $+OP_{PB}$ depending on a polarization of the light entering the PB phase lens. Thus, the optical power(s) of the LC lens(es) to be formed on the respective one or more LC devices and the optical power of the PB phase lens are determined based at least on the vision correction information.

In an example, a relationship between the total optical power of the vision correction optical system and various combinations of individual optical power(s) of the lens(es) in the vision correction optical system can be indicated, for example, by a look-up table, such as shown in FIG. 3. In an example, the respective optical power(s) of the lens(es) in the vision correction optical system can be determined based on the relationship (e.g., the look-up table).

As described above, such as in FIGS. 7A-7C, an LC device (e.g., (241)) in the one or more LC devices can include a first electrode structure and a plurality of first control electrodes that are electrically coupled with the first electrode structure. The first electrode structure can be disposed on a first substrate with a suitable shape, such as an elliptical shape. In an example, the elliptical shape is a circular shape. The first electrode structure can be transparent, and include parallel first segments connected by second segments. The first segments can be longer than the second segments. In an example, an outer boundary of the first electrode structure can have a substantially identical shape (e.g., the elliptical shape) as that of the first substrate.

At step (S1030), a gaze direction of an eye of the user of the display system can be determined, such as described in FIG. 1B. In an example, the sensor 371 can detect information such as eye positions and eye movement indicating the gaze direction and a processor can be configured to determine the gaze direction based on the information detected by the sensor.

At step (S1040), a respective position of each of the LC lens(es) to be formed in the LC device(s) can be determined based on the gaze direction, such as described in FIGS. 1C-1F.

At step (S1050), for each of the LC lens(es) to be formed in the one or more LC devices, (i) a subset of first control electrodes in the plurality of first control electrodes to which first voltage signals are applied and (ii) the first voltage signals to be applied to the subset of first control electrodes can be determined based on the position and the optical power of the LC lens, such as described in FIGS. 8A-8B.

At step (S1060), for each of the LC lens(es) to be formed in the one or more LC devices, the determined first voltage signals can be applied to the determined subset of first control electrodes to form the LC lens at the determined position corresponding to the gaze direction for the vision correction.

Then, the process (1000) proceeds to step (S1099) and terminates.

The process (1000) can be suitably adapted to various scenarios and steps in the process (1000) can be adjusted accordingly. One or more of the steps in the process (1000) can be adapted, omitted, repeated, and/or combined. Any suitable order can be used to implement the process (1000). Additional step(s) can be added.

In an example, one of the one or more LC devices includes a second electrode structure and a plurality of second control electrodes that are electrically coupled with the second electrode structure. The second electrode structure can be disposed on a second substrate that is parallel to the first substrate, and has a substantially identical shape (e.g., the elliptical shape) as that of the first substrate. The second electrode structure can be transparent, and include parallel first segments connected by second segments. The first segments in the second electrode structure can be longer than the second segments in the second electrode structure. In an example, (i) a subset of second control electrodes in the plurality of second control electrodes to which second voltage signals are applied and (ii) the second voltage signals to be applied to the subset of second control electrodes can be determined based on the position and the optical power of the LC lens to be formed in the one of the one or more LC devices. The step (S1060) can be modified as: applying the determined first voltage signals to the determined subset of first control electrodes and applying the determined second voltage signals to the determined subset of second control electrodes to form the LC lens in the one of the one or more LC devices at the determined position corresponding to the gaze direction to correct for the at least one of the nearsightedness or the farsightedness.

In an aspect, one or more steps in the vision correction process described above can be executed iteratively. For example, after step (S1060) is implemented, if the user cannot see clearly the real object or what the display device displays, the process (1000) can go back to step (S1010), and can obtain updated vision correction information, for example, by adjust the vision correction information or obtain new vision correction information. Steps (S1020), (S1050), and (S1060) can be implemented. Thus, the process (1000) can be implemented iteratively, for example, until certain criteria is satisfied. The certain criteria may include (i) the user can see clearly the real object or what the display device displays, (ii) a number of iterations reaches a threshold, and/or the like.

One or more steps described above may be skipped. In an example, if the determined respective optical power(s) of the lens(es) in the vision correction optical system or the total optical power of the vision correction optical system are less than a threshold, the steps after (S1020) can be skipped as the vision correction can be unnecessary.

In an example, if a difference between the determined gaze direction at step (S1030) and a previous gaze direction is less than a threshold, the step (S1040) can be skipped as the change of the gaze direction is small. The step (S1050) can be modified to consider only the optical power(s) of the LC lens(es) without considering the position(s) of the LC lens(es).

At step (S1010), the vision correction information may include default values (or initialization values) for the parameters, for example, if no specific vision correction information is available for the user.

A process (1400) can include multiple steps. In step 1, initialization is performed. The initialization can include calibrating the sensor (371), such as an IR camera for ambient lighting. The initialization can include determining an initial position, a pupil size, and/or other features of each eye. The initialization can include loading or creating a profile indicating an IPD, a spectacle Rx, and/or the like. The initialization can include initializing system parameters sensitivity, accuracy, a response time, and/or the like.

In step 2, image(s) can be captured. In an example, video of the eye or images of the eye can be captured, for example, continuously using the sensor (371) (e.g., the IR camera). Preprocessing can be performed, such as including filtering noises, adjusting contrast of the images, correcting lens distortion, and/or the like.

In step 3, pupil can be detected. For example, the pupil can be located using computer vision techniques. A size, a shape, and an orientation of the pupil can be determined.

In step 4, a depth of focus can be determined based on pupil and other eye features. Step 4 can include analyzing eye focusing on objects at various distances.

In step 5, a gaze direction can be determined. A current pupil position can be compared with known position(s). The gaze direction can be calculated using geometric relationships. In some examples, corrections can be applied to correct for optical or perspective distortions.

In step 6, LC lens integration can be performed. For example, a position (e.g., indicated by coordinates on a device screen) of the LC lens can be determined based on the gaze direction. Information can be provided to the LC lens system. Voltages applied on the ITO substrate can be obtained accordingly.

Some steps in the process (1400) can be performed iteratively or continuously. For example, eye movement can be monitored continuously. In an example, head is assumed not moving. The system can be updated (or adjusted) as necessary, for example, including recalibration and compensating obstructions.

The process (1400) can include error handing, for example, implementing strategies to handles errors such as instances where eye is not detected. The strategies can include reverting to a default state, prompt a user for input, or record the error.

The process (1400) can provide real-time feedback to the user including, for example, visual cues, auditory alerts, and/or the like. The process (1400) can allow the user to interact with the system, pausing tracking, and adjusting settings.

The display system (100) can include other suitable mechanical, electrical and optical components. For example, referring to FIG. 1G, the display system (100) includes a frame (101), or housing, that can protect other components of the display system (100). In another example, the display system (100) can include a strap (not shown) to fit the display system (100) on a head of the user. In another example, the display system (100) can include communication components (not shown, e.g., communication software and hardware) to wirelessly communicate with a network, a host device, and/or other device. In some examples, the display system (100) can include a light combiner that can combine the virtual content and see-through real environment.

Aspects in the disclosure may be used separately or combined in any order.

In an example, electro-tunable LC lenses can replace prescription (Rx) glasses and/or can be used in AR/VR technology for vision correction. Using electro-tunable LC lenses can be beneficial than relying on certain kinds of mechanical adjustments of glass lenses using actuators or manual replacement of Rx lenses as, in some examples, mechanical or manual manipulations can be cumbersome, uncomfortable, and inadequate for accommodating various customer prescriptions, making prolonged usage challenging for users.

LC lenses can be lightweight, thin, and can consume relatively small power, making LC lenses excellent for extended battery life and comfortable wear. In an example, due to the optical path difference in phase modulation devices such as LC lenses, the tunable diopter can be inversely proportional to the square of the aperture (e.g., indicated by an area or a diameter) of the lens, such as shown in Eq. 2, making it challenging to apply LC lenses in HMDs in AR/VR. For example, the LC lenses can have a small aperture or a large aperture with a low diopter. Thus, in an example, the LC lenses can be suitable for correcting presbyopia, however, not myopia. Further, the concentric multi-ring electrodes described with reference to FIGS. 4-5 may result in the fixation of the LC lens within the substrate (or the LC device), making it challenging to dynamically respond to changes in a gaze direction and thus in some example, may result in image distortion at the edge of the LC lens, low off-axis performance, and discomfort during prolonged use.

In the disclosure, methods and apparatuses that can integrates an eye-tracking system with electrically tunable LC lenses are described. The LC lenses can have varifocal capabilities in the focal plane, for example, along the Z axis, and can be moved within the plane (e.g., the XY plane) of the substrate (e.g., (801)). When paired with an eye-tracking system, the LC lenses can respond quickly to adjustments in the depth of field (DoF) and a gaze direction of the human eye, offering a dynamic and precise adaptation to visual requirements.

The display system (e.g., (100)) can provide a streamlined solution for users with Rx glasses, accommodating various interpupillary distances (IPD), and catering to both presbyopia and myopia. In an example, eliminating or mitigating usage of mechanical adjustments in MR display systems may result in a more user-friendly experience. The display system can compensate for image aberrations that can result from imperfections of large field of view (FOV) in optical designs.

In related technologies, the LC lens design can include concentric multi-ring ITO electrodes (such as described with reference to FIGS. 4 and 6), similar to a Fresnel lens pattern. In various examples, when the ITO electrodes are formed, the position of the LC lens cannot be altered. In the disclosure, a linear-serpentine ITO electrode disposed on one or more glass substrates are described, which may allow for rapid adjustments in the activated area of the LC lens within the matrix sandwiched between the two substrates (e.g., (801) and (802)). The adjustments can depend on the ON/OFF status of the control electrodes (e.g., E1-E16 and/or C1-C16) located along the edges of the two substrates. The quantity and placement of the control electrodes can be determined according to the desired specifications. Each electrode line can measure between 5-35 μm in a width, with gaps of approximately 3-5 μm between the segments, such as the first segments.

In some scenarios, the average distance for eye relief is 13 mm, and peripheral vision may refer to the area beyond a circle with a 30° radius or a 60° FOV. Thus, a 15 mm diameter can be used for a single LC lens, (e.g., ~2×13×tan (30°)). The size (e.g., a 15 mm diameter) for an activated area on the glass substrate can encompass the near-peripheral vision, offering an aperture that can be sufficient for visual fixation, the act of maintaining gaze on a single location. An eye-tracking system (e.g., (370)) can facilitate that the direction of eye gaze can pass through the center of the active area, which may be movable in XY plane rapidly as gaze changes. This is useful since the most acute vision is found within central vision, utilized for tasks requiring high spatial resolution, such as reading and driving. As it moves away from the center of gaze, visual acuity continues to decline. Conversely, peripheral vision, while more sensitive to motion, is less sensitive to color and fine detail.

In an example, a lens system (e.g., (240)) includes two electrically tunable LC lenses (e.g., formed in the LC devices (241)-(242)) and one glass lens (e.g., the lens (243)). Together, the lens system can provide a total diopter range of −6D (myopia) to +2D (presbyopia), such as shown in FIG. 3 with an adjustable step of 0.25D steps or finer. The range of correction (−6D to +2D) can be sufficient to cover a majority of users (e.g., more than 90% of users) with the requirement of vision correct, eliminating or mitigating manual adjustment. Here, for the glass lens (e.g., the lens (243)), a N-BK7 Plano-Concave lens with a diameter of 2 inches, a focal length of 500 mm, and AR Coating between 350-700 nm, can be used. The light (e.g., (251) in FIG. 2) through the viewing optics (e.g., the VR viewing optical system (130)) can be linear polarized that matches with the polarization of lens system (e.g., (240)).

In an example, a look-up table (LUT) (e.g., an embedded LUT) within the firmware can establish the correlation between the applied voltage to the LC lenses and the desired optical power of Rx (diopter) set by a specific user. Then, the lens system can be integrated with an eye-tracking system, enabling the rapid movement of the LC lenses to align with the user's gaze direction. In an example, the space coordinate of the gaze direction can be captured by the eye-tracking system and transmitted to the chips. Simultaneously, the controller can identify which segments of the ITO electrodes are to be activated or deactivated to align the position (e.g., the center of LC lenses) with the gaze direction.

Aspects of the disclosure can determine the direction of gaze and enable real-time adjustments to the depth of field (DoF) and allow usage of a larger aperture LC lens and a broader tunable diopter range, enhancing off-axis performance, and alleviating the pupil swim effect.

Computer vision techniques and/or machine learning can detect the pupil and calculate the gaze direction. In an example, a process (e.g., (1000)) can be used to integrate the LC Lenses and eye tracking together.

A computer or computer-readable medium can control various aspects of an HMD system in which the display system (100) including the optical system (110) is incorporated. Various aspects of the display system (100) including implementing the vision correction process, controlling the vision correction via the electrically tunable controller (281), forming LC lenses with different positions that are determined based on the gazing directions, and/or the like can be implemented as computer software using computer-readable instructions and physically stored in one or more computer-readable media. For example, FIG. 11 shows a computer system (1100) suitable for implementing certain aspects of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 11:
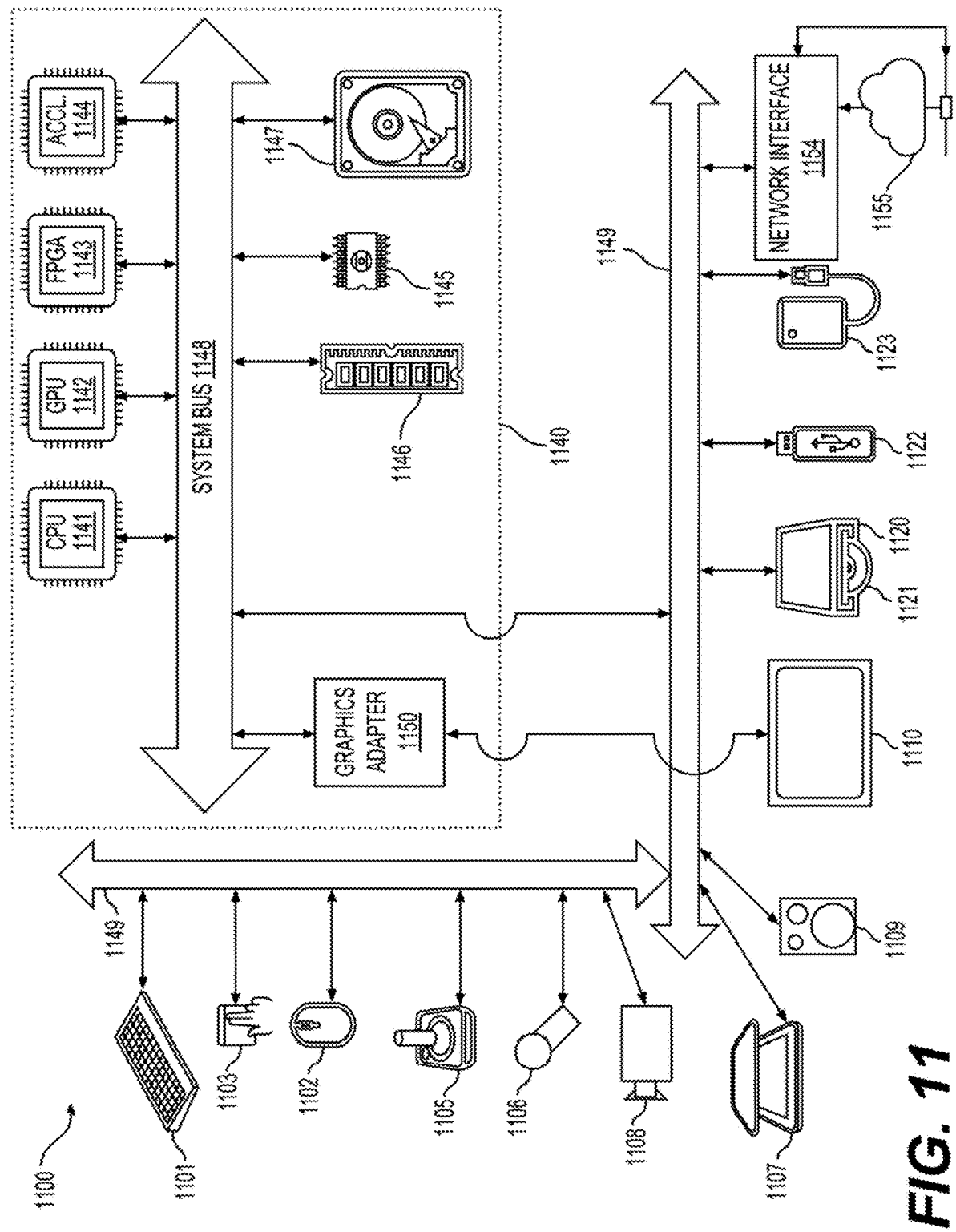
FIG. 11 is a schematic illustration of a computer system in accordance with an aspect.

The components shown in FIG. 11 for computer system (1100) are exemplary in nature and are not intended to suggest any limitation as to the scope of use or functionality of the computer software implementing aspects of the present disclosure. Neither should the configuration of components be interpreted as having any dependency or requirement relating to any one or combination of components illustrated in the exemplary aspect of a computer system (1100).

Computer system (1100) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (1101), mouse (1102), trackpad (1103), touch-screen (1110), data-glove (not shown), joystick (1105), microphone (1106), scanner (1107), camera (1108).

Computer system (1100) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (1110), data-glove (not shown), or joystick (1105), but there can also be tactile feedback devices that do not serve as input devices), audio output devices (such as: speakers (1109), headphones (not depicted)), visual output devices (such as touch-screens (1110) to include CRT screens, LCD screens, plasma screens, OLED screens, each with or without touch-screen input capability, each with or without tactile feedback capability-some of which may be capable to output two dimensional visual output or more than three dimensional output through means such as stereographic output; virtual-reality glasses (not depicted), holographic displays and smoke tanks (not depicted)), and printers (not depicted).

Computer system (1100) can also include human accessible storage devices and their associated media such as optical media including CD/DVD ROM/RW (1120) with CD/DVD or the like media (1121), thumb-drive (1122), removable hard drive or solid state drive (1123), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (1100) can also include an interface (1154) to one or more communication networks (1155). Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (1149) (such as, for example USB ports of the computer system (1100)); others are commonly integrated into the core of the computer system (1100) by attachment to a system bus as described below (for example Ethernet interface into a PC computer system or cellular network interface into a smartphone computer system). Using any of these networks, computer system (1100) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (1140) of the computer system (1100).

The core (1140) can include one or more Central Processing Units (CPU) (1141), Graphics Processing Units (GPU) (1142), specialized programmable processing units in the form of Field Programmable Gate Areas (FPGA) (1143), hardware accelerators (1144) for certain tasks, graphics adapters (1150), and so forth. These devices, along with Read-only memory (ROM) (1145), Random-access memory (1146), internal mass storage (1147) such as internal non-user accessible hard drives, SSDs, and the like, may be connected through a system bus (1148). In some computer systems, the system bus (1148) can be accessible in the form of one or more physical plugs to enable extensions by additional CPUs, GPU, and the like. The peripheral devices can be attached either directly to the core's system bus (1148), or through a peripheral bus (1149). In an example, the touch-screen (1110) can be connected to the graphics adapter (1150). Architectures for a peripheral bus include PCI, USB, and the like.

CPUs (1141), GPUs (1142), FPGAs (1143), and accelerators (1144) can execute certain instructions that, in combination, can make up the aforementioned computer code. That computer code can be stored in ROM (1145) or RAM (1146). Transitional data can be also be stored in RAM (1146), whereas permanent data can be stored for example, in the internal mass storage (1147). Fast storage and retrieve to any of the memory devices can be enabled through the use of cache memory, that can be closely associated with one or more CPU (1141), GPU (1142), mass storage (1147), ROM (1145), RAM (1146), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system (1100) having architecture, and specifically the core (1140) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (1140) that are of non-transitory nature, such as core-internal mass storage (1147) or ROM (1145). The software implementing various aspects of the present disclosure can be stored in such devices and executed by core (1140). A computer-readable medium can include one or more memory devices or chips, according to particular needs. The software can cause the core (1140) and specifically the processors therein (including CPU, GPU, FPGA, and the like) to execute particular processes or particular parts of particular processes described herein, including defining data structures stored in RAM (1146) and modifying such data structures according to the processes defined by the software. In addition or as an alternative, the computer system can provide functionality as a result of logic hardwired or otherwise embodied in a circuit (for example: accelerator (1144)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

While this disclosure has described several exemplary aspects, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A liquid crystal (LC) device, comprising:
a first electrode structure disposed on a first substrate with an elliptical shape, the first electrode structure being transparent and including parallel first segments connected by second segments, the first segments being longer than the second segments;
a plurality of first control electrodes that are electrically coupled with the first electrode structure, the plurality of first control electrodes being configured to form LC lenses with different positions, each of the LC lenses with the different positions being formed when electrical signals are applied to a subset of the plurality of first control electrodes that is associated with the respective LC lens;
a second electrode structure disposed on a second substrate that is parallel to the first substrate; and
at least one second control electrode that is electrically coupled with the second electrode structure.

2. The LC device according to claim 1, wherein a region of the first substrate that includes the first electrode structure has the elliptic shape.

3. The LC device according to claim 1, wherein the first segments are linear.

4. The LC device according to claim 1, wherein the elliptical shape is a circular shape.

5. The LC device according to claim 1, wherein
the second substrate has an elliptical shape,
the second electrode structure is transparent and includes parallel first segments connected by second segments and the first segments are longer than the second segments,
the at least one second control electrode includes a plurality of second control electrodes, and
each of the LC lenses with the different positions is formed when the electrical signals are applied to the subset of the plurality of first control electrodes that is associated with the respective LC lens and electrical signals are applied to a subset of the plurality of second control electrodes that is associated with the respective LC lens.

6. The LC device according to claim 5, wherein the first segments in the first electrode structure are perpendicular to the first segments in the second electrode structure.

7. The LC device according to claim 1, wherein a width of the first segments is from 1 to 100 microns, a gap between adjacent segments of the first segments is from 1 to 10 microns, and an area of the LC lens is from 1 millimeter (mm) to 20 mm.

8. The LC device according to claim 1, wherein a difference between a first resistance between a first adjacent pair of the plurality of first control electrodes and a second resistance between a second adjacent pair of the plurality of first control electrodes is less than a threshold.

9. A head mounted display (HMD) system, comprising:
a sensor configured to detect information indicating a gaze direction of an eye of a user of the HMD system,
a processor configured to determine the gaze direction based on the information detected by the sensor,
a liquid crystal (LC) device including:
a first electrode structure disposed on a first substrate with an elliptical shape, the first electrode structure being transparent and including parallel first segments connected by second segments, the first segments being longer than the second segments,
a plurality of first control electrodes that are electrically coupled with the first electrode structure, the plurality of first control electrodes being configured to form LC lenses with different center positions to adjust an optical power of the HMD system, each of the LC lenses with the different center positions being formed when electrical signals are applied to a subset of the plurality of first control electrodes that is associated with the respective LC lens,
a second electrode structure disposed on a second substrate that is parallel to the first substrate, and
at least one second control electrode that is electrically coupled with the second electrode structure, and
a controller configured to determine a subset of first control electrodes in the plurality of first control electrodes based on the gaze direction.

10. The HMD system according to claim 9, wherein a region of the first substrate that includes the first electrode structure has the elliptic shape.

11. The HMD system according to claim 9, wherein the first segments are linear.

12. The HMD system according to claim 9, wherein the elliptical shape is a circular shape.

13. The HMD system according to claim 9, wherein
the second substrate has an elliptical shape,
the second electrode structure is transparent and includes parallel first segments connected by second segments,
the first segments are longer than the second segments,
the at least one second control electrode includes a plurality of second control electrodes, and
each of the LC lenses with the different center positions is formed when the electrical signals are applied to the subset of the plurality of first control electrodes that is associated with the respective LC lens and electrical signals are applied to a subset of the plurality of second control electrodes that is associated with the respective LC lens.

14. The HMD system according to claim 13, wherein the first segments in the first electrode structure are perpendicular to the first segments in the second electrode structure.

15. The HMD system according to claim 9, wherein a difference between a first resistance between a first adjacent pair of the plurality of first control electrodes and a second resistance between a second adjacent pair of the plurality of first control electrodes is less than a threshold.

16. The HMD system according to claim 9, further comprising:
a virtual reality (VR) viewing optical system disposed between a display device and the LC device, the VR viewing optical system including a plurality of lenses configured to direct light beams from the display device to the LC lens formed in the LC device, the optical power of the HMD system being based on an optical power of the LC lens and an optical power of the VR viewing optical system.

17. The HMD system according to claim 9, further comprising:
an augmented reality (AR) viewing optical system disposed between a display device and the LC device, the AR viewing optical system including a plurality of lenses configured to direct light beams from the display device and light beams from a real object to the LC lens formed in the LC device, the optical power of the HMD system being based on an optical power of the LC lens and an optical power of the AR viewing optical system.

18. A method of tuning a display system, comprising:
determining, based on vision correction information of a user of the display system, an optical power of a liquid crystal (LC) lens to be formed in an LC device for vision correction, the LC device including a first electrode structure and a plurality of first control electrodes that are electrically coupled with the first electrode structure, wherein the first electrode structure is disposed on a first substrate with an elliptical shape, is transparent, and includes parallel first segments connected by second segments, and the first segments are longer than the second segments;
determining a gaze direction of an eye of the user of the display system;
determining a position of the LC lens in the LC device based on the gaze direction;
determining (i) a subset of first control electrodes in the plurality of first control electrodes to which first voltage signals are applied and (ii) the first voltage signals to be applied to the subset of first control electrodes based on the position and the optical power of the LC lens; and
applying the determined first voltage signals to the determined subset of first control electrodes to form the LC lens at the determined position corresponding to the gaze direction for the vision correction.

19. The method according to claim 18, wherein
the LC device includes a second electrode structure and a plurality of second control electrodes that are electrically coupled with the second electrode structure,
the second electrode structure is disposed on a second substrate that is parallel to the first substrate, has an elliptical shape, is transparent, and includes parallel first segments connected by second segments, and the first segments in the second electrode structure are longer than the second segments in the second electrode structure,
the method further includes determining (i) a subset of second control electrodes in the plurality of second control electrodes to which second voltage signals are applied and (ii) the second voltage signals to be applied to the subset of second control electrodes based on the position and the optical power of the LC lens, and
the applying includes applying the determined first voltage signals to the determined subset of first control electrodes and applying the determined second voltage signals to the determined subset of second control electrodes to form the LC lens at the determined position corresponding to the gaze direction to correct for the at least one of the nearsightedness or the farsightedness.

* * * * *